United States Patent
Xu et al.

(10) Patent No.: US 12,248,877 B2
(45) Date of Patent: Mar. 11, 2025

(54) HYBRID NEURAL NETWORK PRUNING

(71) Applicant: Movidius Ltd., Schiphol-Rijk (NL)

(72) Inventors: Xiaofan Xu, Dublin (IE); Mi Sun Park, San Jose, CA (US); Cormac M. Brick, San Francisco, CA (US)

(73) Assignee: Movidius Ltd., Schiphol-Rijk (NL)

( * ) Notice: Subject to any disclaimer, the term of this patent is extended or adjusted under 35 U.S.C. 154(b) by 1262 days.

(21) Appl. No.: 16/226,521

(22) Filed: Dec. 19, 2018

(65) Prior Publication Data

US 2019/0362235 A1    Nov. 28, 2019

Related U.S. Application Data

(60) Provisional application No. 62/675,601, filed on May 23, 2018.

(51) Int. Cl.
*G06N 3/082*    (2023.01)
*G06N 3/04*     (2023.01)
(Continued)

(52) U.S. Cl.
CPC ............... *G06N 3/082* (2013.01); *G06N 3/04* (2013.01); *G06N 3/044* (2023.01); *G06T 7/70* (2017.01);
(Continued)

(58) Field of Classification Search
CPC ........ G06N 3/082; G06N 3/04; G06N 3/0445; G06N 20/00; G06N 3/049; G06N 3/084;
(Continued)

(56) References Cited

U.S. PATENT DOCUMENTS 10,832,136 B2 * 11/2020 Kadav ................ G06F 17/153
2016/0328643 A1 * 11/2016 Liu .................... G06T 7/0012
(Continued)

FOREIGN PATENT DOCUMENTS

WO    2019226686 A2    11/2019

OTHER PUBLICATIONS

Polyak, Adam, and Lior Wolf. "Channel-level acceleration of deep face representations." IEEE Access 3 (2015): 2163-2175. (Year: 2015).*

(Continued)

*Primary Examiner* — Michael J Huntley
*Assistant Examiner* — Sehwan Kim
(74) *Attorney, Agent, or Firm* — Akona IP PC

(57) ABSTRACT

A pruned version of a neural network is generated by determining pruned versions of each a plurality of layers of the network. The pruned version of each layer is determined by sorting a set of channels of the layer based on respective weight values of each channel in the set. A percentage of the set of channels are pruned based on the sorting to form a thinned version of the layer. Accuracy of a thinned version of the neural network is tested, where the thinned version of the neural network includes the thinned version of the layer. The thinned version of the layer is used to generate the pruned version of the layer based on the accuracy of the thinned version of the neural network exceeding a threshold accuracy value. A pruned version of the neural network is generated to include the pruned versions of the plurality of layers.

18 Claims, 17 Drawing Sheets

(51) Int. Cl.
  *G06N 3/044* (2023.01)
  *G06N 20/00* (2019.01)
  *G06T 7/70* (2017.01)
(52) U.S. Cl.
  CPC .... *G06N 20/00* (2019.01); *G06T 2207/10024* (2013.01); *G06T 2207/10028* (2013.01); *G06T 2207/20081* (2013.01)
(58) Field of Classification Search
  CPC .......... G06N 3/0454; G06N 3/08; G06T 7/70; G06T 2207/10024; G06T 2207/10028; G06T 2207/20081; G06T 17/00; G06T 2207/20084; G06T 2207/30196; G06T 2207/30252; G06T 17/10; G06T 19/003
  See application file for complete search history.

(56) References Cited

U.S. PATENT DOCUMENTS

| | | | | |
|---|---|---|---|---|
| 2018/0365794 | A1* | 12/2018 | Lee | G06N 3/048 |
| 2019/0087729 | A1* | 3/2019 | Byun | G06N 3/045 |
| 2020/0234130 | A1* | 7/2020 | Yan | G06N 3/082 |
| 2020/0394520 | A1* | 12/2020 | Kruglov | G06N 3/045 |

OTHER PUBLICATIONS

Li, Hao, et al. "Pruning filters for efficient convnets." arXiv preprint arXiv:1608.08710 (2016). (Year: 2016).*
Babaeizadeh, Mohammad, Paris Smaragdis, and Roy H. Campbell. "Noiseout: A simple way to prune neural networks." arXiv preprint arXiv:1611.06211 (2016). (Year: 2016).*
Guo, Yiwen, Anbang Yao, and Yurong Chen. "Dynamic network surgery for efficient dnns." Advances in neural information processing systems 29 (2016). (Year: 2016).*
Herv's, C., et al. "Optimization of computational neural network for its application in the prediction of microbial growth in foods." Food science and technology international 7.2 (2001): 159-163. (Year: 2001).*
Zhao, Wei, et al. "An FPGA implementation of a convolutional auto-encoder." Applied Sciences 8.4 (2018): 504. (Year: 2018).*
Liu, Zhuang, et al. "Learning efficient convolutional networks through network slimming." Proceedings of the IEEE international conference on computer vision. 2017. (Year: 2017).*
Collobert, Ronan, Koray Kavukcuoglu, and Clement Farabet. "Torch7: A matlab-like environment for machine learning." BigLearn, NIPS workshop. No. CONF. 2011. (Year: 2011).*
Gupta, Suyog, et al. "Deep learning with limited numerical precision." International conference on machine learning. PMLR, 2015. (Year: 2015).*
Anwar, Sajid, and Wonyong Sung. "Coarse pruning of convolutional neural networks with random masks." (2016). (Year: 2016).*
He, Yihui, Xiangyu Zhang, and Jian Sun. "Channel pruning for accelerating very deep neural networks." Proceedings of the IEEE international conference on computer vision. 2017. (Year: 2017).*
Chin, Ting-Wu, et al., "Layer-Compensated Pruning for Resource-Constrained Convolutional Neural Networks," arXiv preprint, Oct. 18, 2012; 12 pages.
Guo, Yiwen, et al., "Dynamic Network Surgery for Efficient DNNs," 30th Conference on Neural Information Processing Systems (NIPS); Barcelona, Spain, 2016; 9 pages.
Han, Song, et al.; "Learning both Weights and Connections for Efficient Neural Networks," retrieved online at https://arxiv.org/abs/1506.02626; Oct. 30, 2015; 9 pages.
He, Kaiming, et al.; "Deep Residual Learning for Image Recognition," Proceedings of the IEEE Conference on Computer Vision and Pattern Recognition, 2016; 9 pages.
He, Yang, et al.; "Soft Filter Pruning for Accelerating Deep Convolutional Neural Networks," Proceedings of the 27th International Joint Conference on Artificial Intelligence, 2018; 7 pages.
He, Yihui, et al.; "AMC: AutoML for Model Compression and Acceleration on Mobile Devices," in Proceedings of the European Conference on Computer Vision (ECCV), 2018; 17 pages.
He, Yihui, et al.; "Channel Pruning for Accelerating Very Deep Neural Networks," in The IEEE International Conference on Computer Vision (ICCV); Aug. 2017; 10 pages.
Huang, Gao, et al.; "Densely Connected Convolutional Networks," in Proceedings of the IEEE Conference on Computer Vision and Pattern Recognition, 2017; 9 pages.
Li, Hao, et al.; "Pruning Filters for Efficient ConvNets," published in the International Conference on Learning Representations (ICLR), 2017; 13 pages.
Lin, Ji, et al.; "Runtime Neural Pruning," in the 31st Conference on Neural Information Processing Systems (NIPS), Long Beach, California; 2017; 11 pages.
Liu, Zhuang, et al.; "Learning Efficient Convolutional Networks through Network Slimming," published in the International Conference on Computer Vision (ICCV), 2017; 9 pages.
Luo, Jian-Hao, et al.; "ThiNet: A Filter Level Pruning Method for Deep Neural Network Compression," retrieved online at https://arxiv.org/abs/1707.06342; Jul. 20, 2017; 9 pages.
Molchanov, Pavlo, et al.; "Pruning Convolutional Neural Networks for Resource Efficient Inference," published in the International Conference on Learning Representations (ICLR), Jun. 2017; 17 pages.
Simonyan, Karen, et al.; "Very Deep Convolutional Networks for Large-Scale Image Recognition," in the International Conference on Learning Representations (ICLR), Apr. 2015; 14 pages.
Szegedy, Christian, et al.; "Going Deeper with Convolutions," retrieved online at https://arxiv.org/abs/1409.4842; Sep. 17, 2014; 12 pages.
Wang, Huan, et al.; "Structured Probabilistic Pruning for Convolutional Neural Network Acceleration," retrieved online at https://arxiv.org/abs/1709.06994; Sep. 10, 2018; 13 pages.
Yu, Ruichi, et al.; "NISP: Pruning Networks using Neuron Importance Score Propagation," retrieved online at https://arxiv.org/abs/1711.05908; Mar. 21, 2018; 15 pages.

* cited by examiner $$mask_l^n(i,j) = \begin{cases} 0 & \text{if } |W_l^n(i,j)| < t_l^n \\ 1 & \text{if } |W_l^n(i,j)| \geq t_l^n \end{cases}$$

$$t_l^n = mean(|W_l^n|) + std(|W_l^n|) \times \sigma$$

HYBRID NEURAL NETWORK PRUNING

RELATED APPLICATIONS

This application claims benefit to U.S. Provisional Patent Application Ser. No. 62/675,601 filed May 23, 2018 and incorporated by reference herein in its entirety.

TECHNICAL FIELD

This disclosure relates in general to the field of computer systems and, more particularly, to configuring neural network models for resource constrained computing systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators. Such hardware may utilize machine learning models, such as convolutional neural networks (CNNs) in connection with machine learning and artificial intelligence operations performed in connection with computer vision applications.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

DETAILED DESCRIPTION OF EXAMPLE EMBODIMENTS

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

Figure 1:
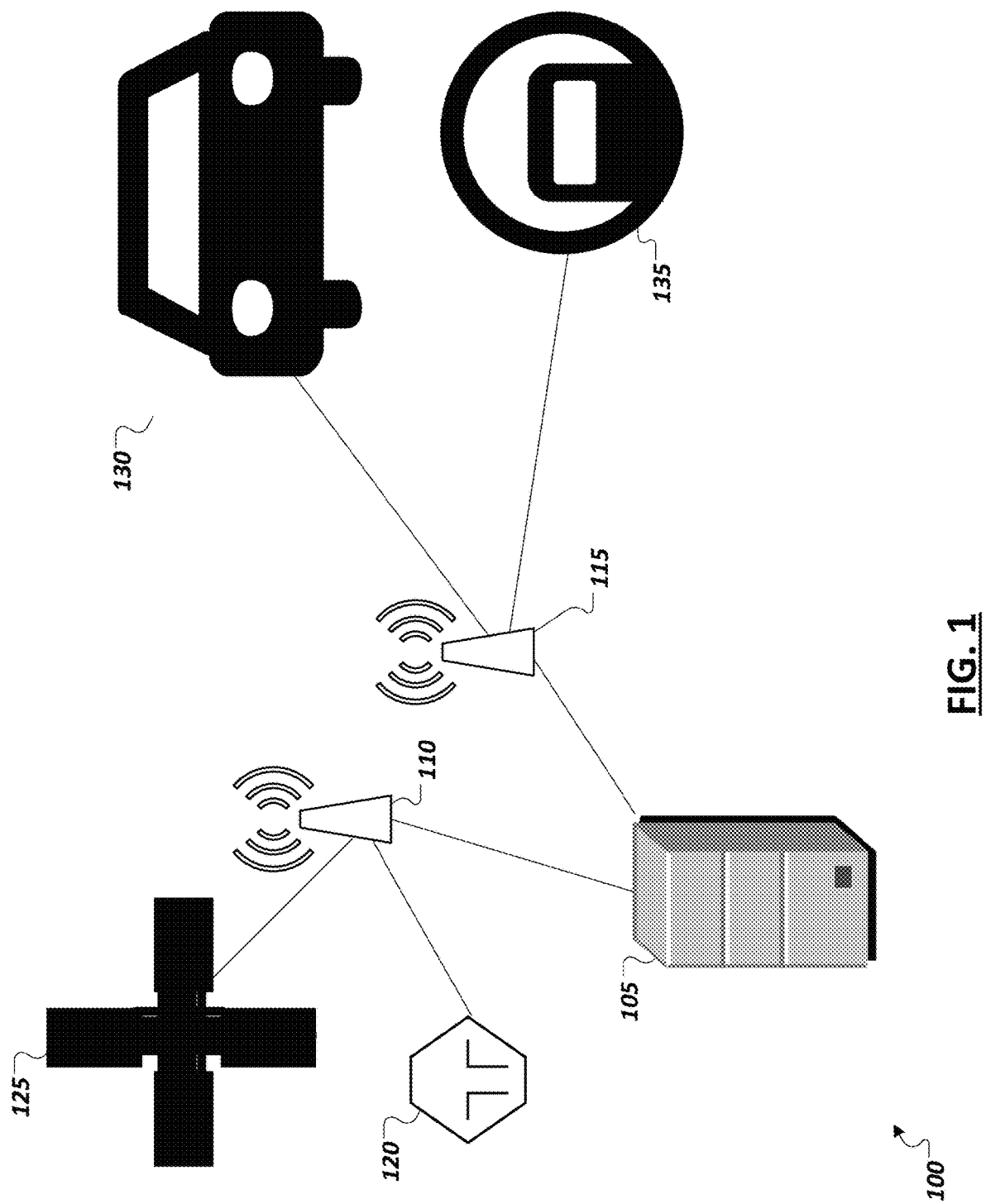
FIG. 1 illustrates an example system including resource-constrained computing devices and a host computing system.

FIG. 1 is a simplified block diagram 100 illustrating a system that includes various devices (e.g., 120, 125, 130, 135) capable of utilizing machine learning models in the course of their operation. For instance, devices may utilize neural network models in connection with detecting persons, animals, or objects within their respective environments and/or conditions, characteristics, and events within these environments based on sensor data generated at the devices 120, 125, 130, 135 and/or received from outside sources (e.g., other devices). For instance, devices may include vehicles (e.g., 130), drones (e.g., 125), robots (e.g., 135), and other devices, which possess autonomous navigation capabilities, allowing the devices to detect attributes and conditions within physical space, plan paths within the environment, avoid collisions, and interact with things within the environment utilizing one or more sensors or a suite of different sensors. The data generated from these sensors may be provided as an input to a machine learning model, such as a neural network model (e.g., convolutional neural network (CNN), deep neural network (DNN), spiking neural network (SNN), etc.), from which one or more outputs may be generated that cause actuators of the device (e.g., 125, 130, 135) to autonomously direct movement of the device within the environment. Neural networks models and machine learning, may be utilized in potentially limitless applications, including many outside of autonomous navigation. As an example, internet of things (IoT) devices, security devices, monitors, agricultural sensor device, and other devices (e.g., 120) may also be equipped with one or multiple sensors and the data generated by these sensors may be provided for processing using a neural network model, enabling the device (e.g., 120) to generate events, alarms, or other data which may be presented to a user or provided to other (e.g., backend) computing systems for further processing, aggregation, and/or analysis.

In some implementations, neural network models may be developed by a variety of different developers and entities. The neural network models may be developed and trained on corresponding computing systems using a variety of different training data, depending on the intended use of the model. These models may then be deployed on and used by various devices (e.g., 120, 125, 130, 135) to enable the machine learning and artificial intelligence capabilities of the devices. In some implementation, neural network models may be hosted on host server systems (e.g., 105) and accessed by manufacturers, owners, or users of various devices (e.g., 120, 125, 130, 135) to implement the neural network models on the devices. In some implementations, wireless network connections (e.g., facilitated by network access points and gateway devices (e.g., 115, 120)) may be utilized to transfer neural network models onto devices (e.g., 120, 125, 130, 135). In other cases, a portable memory drive or physical connection to a local host system may be utilized to transfer neural network models onto the devices that are to use these models, among other examples.

As machine learning and artificial intelligence increase in prominence, both in academic research and commercial applications, a variety of neural network models have been and are being developed. Coupled with the increasing size of large-scale datasets and high-end graphics, matrix, and tensor processing devices (e.g., GPUs, TPUs, machine learning accelerators, etc.), the size and complexity of deep learning neural networks are also increasing. Although many such modern network models (e.g., such as Visual Geometry Group (VGG) neural network, GoogleNet, DenseNet, ResNets, and others) show outstanding classification performance on large data sets (e.g., ImageNet), they typically occupy large memory footprints and demand significant compute resources. Accordingly, some neural network models, despite their utility, are not easily deployable on resource-constrained inference devices, such as devices with small form factors, batter powered devices, devices with modest memory and processing capabilities, devices with modest communication capabilities, etc. In short, modern, sophisticated neural network models may not be used or deployed in some instances on resource-constrained devices due to these models' large demands for memory, compute resources, and power.

Figure 2:
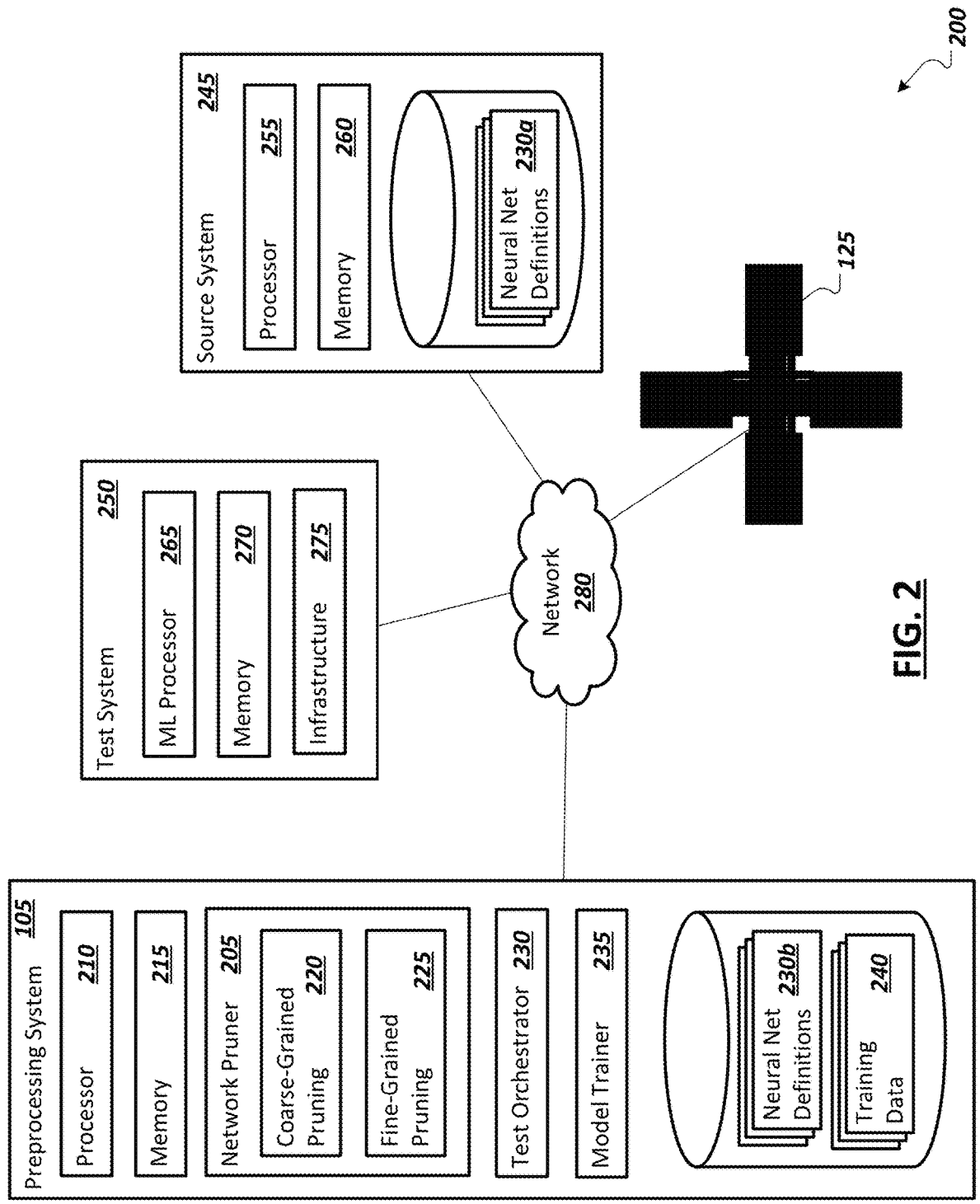
FIG. 2 illustrates an example system including a preprocessing system for preparing pruned versions of neural network models.

Turning to FIG. 2, a simplified block diagram 200 is shown illustrating an example system including a system 105 for use in performing preprocessing on existing neural network models (e.g., 230*a-b*) to adapt and prepare the models for distribution to and use by resource-constrained devices (e.g., 125) and other computing systems, where it is desired to utilize lean, or sparse, versions of a neural network model. In one example, a pre-processing system 105 may implement a network pruner tool 205, implemented in hardware- and/or software-based logic on the preprocessing system 105. The preprocessing system 105 may include one or more data processing devices (e.g., a central processing units (CPUs), graphics processing unit (GPUs), tensor processing units (TPUs)) and corresponding hardware accelerators (e.g., machine learning accelerators, matrix arithmetic accelerators, etc.) co-functioning with the processors 210. The preprocessing system 105 may further include one or more computer memory elements 215 to store software code (e.g., to implement all or a portion of the network pruner tool 205 and other tools (e.g., 230, 235) of the preprocessing system) as well as data (e.g., 230*b*, 240, etc.) used in operation of the preprocessing system 105 generally, including the network pruner tool 205 specifically.

In one example implementation, a network pruner tool 205 may support and provide functionality to perform both coarse-grained neural network pruning (e.g., to prune channels, kernels, or nodes from the neural network model) (using coarse-grained pruning module 220), as well as more surgical, fine-grained neural network pruning (e.g., to prune individual weights from the model) (using fine-grained pruning module 225). In some implementations, the network pruner tool 205 can utilize both coarse-grained and fine-grained pruning to generate a sparse, pruned, or thinned version of a particular neural network. Accordingly, the benefits and functionality enabled through a "dense" modern neural network, adapted for systems and applications where more robust memory, computer, and communication resources are available, may be extended to resource-constrained systems by reducing the size and computational complexity of the neural network without detrimentally sacrificing accuracy.

Neural network models (e.g., 230*a*-230*b*) may be developed on and hosted by a variety of different systems (e.g., 105, 245). The preprocessing system 105 may access one or more of these neural network models from remote computing systems (e.g., source system 245) over one or more networks (e.g., 280). In some instances, a preprocessing system 105 may provide the network pruner tool 205 as a service (through networks 280) to various client systems (e.g., a resource constrained system 125). In such implementations, a query or request may be submitted to the preprocessing system 105 identifying a particular neural network model and requesting that the model be pruned (e.g., through coarse-grained pruning, fine-grained pruning, or hybrid-pruning (e.g., coarse-grained pruning followed by fine-grained pruning)). In some cases, a copy of the neural network model may be included in the request.

In some implementations, a coarse-grained pruning logic block 220 of an example network pruner tool 205 may identify the relative importance of various channels, kernels, and/or nodes of a neural network and iteratively prune the model to first remove those portions of the neural network determined to be less important. Importance, in this sense, reflects the neural network's sensitivity to the removal of these portions affecting the pruned neural network's accuracy. After each pruning iteration, the pruned neural network may be tested for accuracy to determine whether additional portions may be pruned while keeping the accuracy of the model within an acceptable threshold or range of values. For instance, a test orchestrator 230 may be automatically summoned by the coarse-grained pruning block 220 to implement a pruned version of the neural network on a computing platform (e.g., 250), provide test data as an input to the pruned neural network, and perform a test on the pruned neural network to determine an accuracy value for the pruned neural network based on one or more outputs generated from the test data input to the pruned neural network. In some implementations, the test may be implemented as a fast sensitivity test, such as described herein, to be performed to identify channels for pruning, allowing for a relatively quick test of the resulting accuracy, which does not require re-training of the pruned model. In some implementations, the coarse-grained pruning logic block may support multiple different pruning algorithms and may perform pruning according to any one of these pruning techniques (e.g., as requested by a user or system seeking to prune a particular neural network). The coarse-grained pruning block 220 may function autonomously, taking as inputs, such values as a neural network model (e.g., 230b) to be pruned, a target accuracy value or rule for the pruned neural network model, among other potential inputs.

In some implementations, a fine-grained pruning logic block 225 may automatically detect weights with values falling below a threshold absolute value and may prune these weights to further reduce the size and computationally complexity of the neural network. Such fine-grained pruning may be performed on the original, dense version of a neural network model, or a pruned neural network (e.g., pruned using coarse-grained pruning block 220). The fine-grained pruning may be performed iteratively during training of the neural network, based on statistical measurements of the neural network's collective weight values. Model training may be performed by model training logic 235 (at the direction of or in cooperation with fine-grained pruning logic block 225) using a particular training data set (e.g., 240). The fine-grained pruning block may be equipped with functionality to add-back, or splice, previously pruned weight values during the training, based on detecting, through the trainings, that a weight previously determined to be unimportant, is, in fact, relatively important. As noted above, a threshold weight value may be used to determine whether a weight should be pruned. In some cases, a single threshold weight value may be determined to me applied to pruning across the entire neural network model. In other cases, multiple different layer-specific threshold weight values may be determined for a neural network model, and fine-grained pruning at any given layer within the neural network model may be pruned based on the corresponding layer-specific value, among other example implementations.

Like the coarse-grained pruning logic block 220, the fine-grained pruning logic block 225 may also function and perform pruning actions autonomously, without human intervention or participation (outside of a request to perform the pruning). In cases where hybrid pruning is to be performed, the fine-grained pruning logic block 225 may be controlled and triggered by the coarse-grained pruning block 220, with the coarse-grained pruning block 220 providing a pruned version of an original neural network definition to the fine-grained pruning block 225 and directing the fine-grained pruning block to further prune the model at the weight level, among other example implementations.

In some implementations, a preprocessing system 105 may be combined with functionality of other systems (e.g., 245, 250) described herein, which may provide functionality for use in connection with pruning of neural network models. In other cases, the system 200 (and even preprocessing system 105) may be implemented on multiple different computing systems, which may communicate and cooperate using one or more networks 280. For instance, tests of pruned networks may be carried out using a test system 250, equipped with one or more processor devices (e.g., 265), memory 270, and other system architecture or infrastructure 275 enabling the test system 250 to run the neural network and testing a pruned version's accuracy at the direction of test orchestrator 230. Similarly, original version of neural networks, as well as copies of the resulting thinned, or pruned, versions of these neural networks may be stored, maintained, or hosted on other systems (e.g., source system 245). For instance, a source system 245 may include one or more processor devices and one or more memory elements to maintain neural network model definitions (e.g., 230a), which may be accessed by the preprocessing system 105 or by end devices (e.g., 125), which are to use these models to perform machine learning tasks, among other example implementations.

In general, "servers," "clients," "computing devices," "network elements," "hosts," "devices," "platforms", and "systems", etc. described in connection with the examples herein, include electronic computing devices operable to receive, transmit, process, store, or manage data and information associated with the computing environment. As used in this document, the term "computer," "processor," "processor device," "processing apparatus," or "processing device" is intended to encompass any suitable processing apparatus. For example, elements shown as single devices within the computing environment may be implemented using a plurality of computing devices and processors, such as server pools, distributed systems, cloud- and/or fog-based systems, and other systems including multiple computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

In some implementations, all or a portion of a computing platform may function as an Internet of Things (IoT) device or system. A collection of devices, or endpoints, may participate in IoT networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

While FIGS. 1-2 are described as containing or being associated with a plurality of elements, not all elements illustrated may be utilized in each alternative implementation of the present disclosure. Additionally, one or more of the elements described in connection with the examples of FIGS. 1 and 2 may be located external to the illustrated computing environments, while in other instances, certain elements may be included within or as a portion of one or more of the other described elements, as well as other elements not described in the illustrated implementation. Further, certain elements illustrated in these examples may be combined with other components, as well as used for alternative or additional purposes in addition to those purposes described herein.

Figure 3:
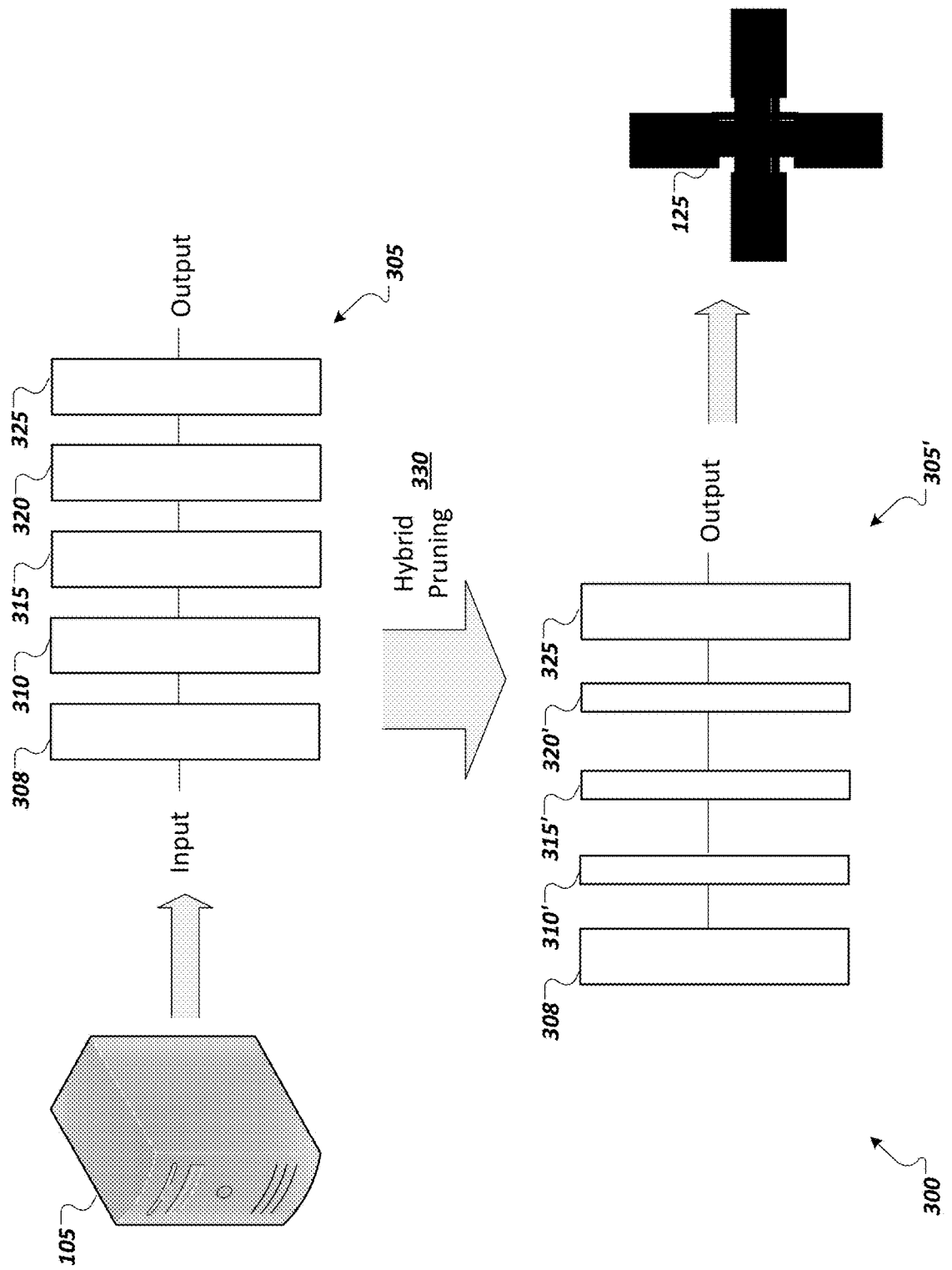
FIG. 3 illustrates pruning of an example neural network model.

Turning to FIG. 3, a simplified block diagram is shown illustrating the example pruning, or thinning, of an example neural network model 305. The neural network model 305 (or simply "neural network") may be originally developed and trained on a system (e.g., 105) with robust computing resources, making the size and computational complexity of the neural network of small concern when used on such systems (e.g., 105). A neural network 305 may include a number of layers, including an input layer (e.g., 308), output layer (e.g., 325), and a number of different hidden layers (e.g., 310, 315, 320) interconnected between the input and output layers. Each layer may include a number of nodes, neurons, or kernels, and the neurons may be interconnected in a variety of ways between the layers. The hidden layers may include one or more different types of layers such as dense layers, convolutional layers, pooling layers, and recurrent layers, among other examples.

As illustrated in FIG. 3, hybrid pruning may be performed on the original version of the neural network 305 to thin one or more of the layers of the model. In some implementations, pruning may involve pruning each of the layers of the model. In other instances, one or more of the layers may be left unpruned. For instance, as illustrated in the example of FIG. 3, the input and output layers 308, 325 may be left unpruned, with the pruning instead focused on hidden layers 310, 315, 320. In this example hybrid pruning 330 may be performed, in which coarse-grained and fine-grained pruning are performed on layers 310, 315, 320, to generate thinned layers 310', 315', 320'. These thinned layers may replace the original, dense versions of the layers 310, 315, 320 to form a thinned, or pruned, version of the neural network 305'. This thinned, or sparse, neural network model 305' may be dramatically smaller in size, making the model 305' well-suited for use by and implementation on a resource-constrained device possessing significantly lower memory and processing power than conventional computing systems for which use of the originally-sized dense model 305 is better suited.

As introduced above, neural network pruning may refer to the removal of some redundant weights (or channels) which are determined or predicted to not contribute meaningfully to the output of a network. Pruning a neural network model reduces the model size and thereby helps preventing overfitting, and eventually generates a sparse (or thinner) version of the model. Weight pruning, for instance, shows high compression rate on some neural networks by pruning redundant weights or additionally allowing splicing of previously pruned weights. Channel-pruning prunes entire channels of the model (i.e., as opposed to the more surgical pruning of individual weights). However, naively pruning an amount of channels based on a calculation of importance of channels, may result in drastic reduction in the accuracy of systems employing the model in machine learning applications. For instance, while channel pruning may cause channels determined to be relatively less important to be removed, and thereby finetune the pruned network, individual network models have different sensitivity within and across layers to output accuracy. Therefore, evenly pruning 50% of channels in all the layers, for instance, may result in a significant accuracy drop.

In some implementations, a computing system (e.g., 105) may be equipped with logic implemented in hardware and/or software that is capable of generating a pruned, sparse version of a neural network utilizing a hybrid pruning approach, which combines both coarse-grained channel pruning and fine-grained weight pruning to reduce the overall model size. The resulting sparse neural network model may also result in decreased computation and power demands with little to no loss in accuracy, thereby enabling sophisticated, modern neural networks to be deployed on resource-constrained devices, such as always-on security cameras, IoT devices, drones, among other examples. In some implementations, the coarse-grained pruning portion of the hybrid pruning approach may utilize a fast sensitivity test to quickly identify the sensitivity within and across layers of a network to the output accuracy for target multiplier-accumulators (MACS) or accuracy tolerance, among other example implementations. In hybrid pruning, upon pruning the channels of a neural network model to generate a thinned model, additional weight pruning may be performed on the remaining channels to further reduce model size and computation.

Figure 4:
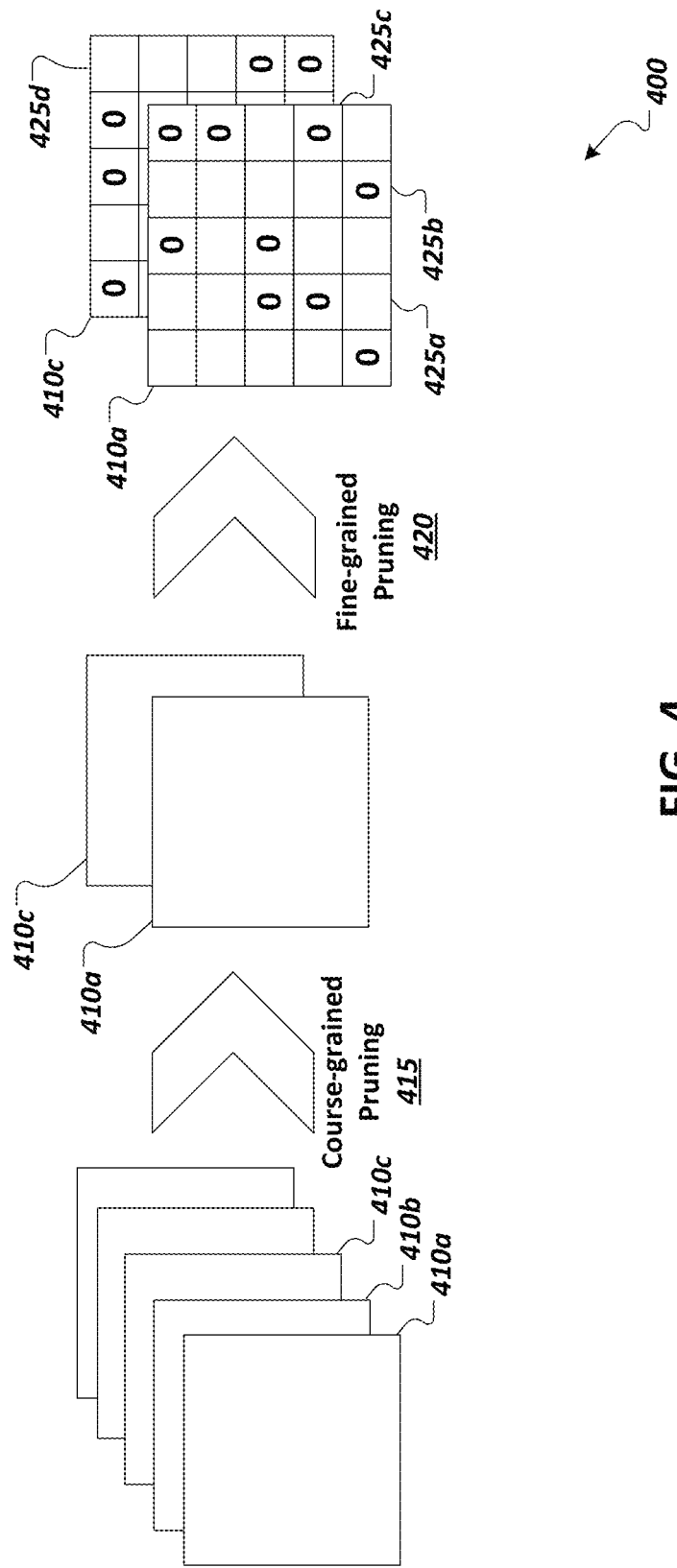
FIG. 4 illustrates an example of hybrid pruning of at least a portion of an example neural network model.

Turning to FIG. 4, a simplified block diagram 400 is shown illustrating an example of hybrid pruning of layers of a target neural network. Pruning of a single layer of the target neural network is represented in the illustration of FIG. 4. Accordingly, hybrid pruning may be performed on a per layer basis to generate, for each of the layers of a neural network model, a thinned layer. These thinned layers are adopted within a thinned, or pruned, version of the neural network model. As shown in FIG. 4, in a hybrid approach, both coarse-grained channel pruning (415) and fine-grained weight pruning (420) on the may be performed on convolutional layers for various types of neural networks to generate thinner sparse versions of these neural network without a detrimental loss in accuracy. Specifically, during channel pruning 415 (or similarly in neuron or kernel pruning), a portion of the channels (e.g., 410a, 410c) in a given layer may be selected to be preserved within a sparse version of the neural network, while other channels (e.g., 410b) are pruned and removed from the neural network. Fine-grained pruning 420 may then be performed on the weights within the remaining, unpruned channels (e.g., 410a, 410c), such that a portion of the weights (e.g., 425a, 425d) are preserved, while others are pruned such that their weight values are artificially changed to zero, such that they can be ignored (e.g., by hardware equipped with functionality to identify and take advantage of sparse data sets or models (e.g., by preemptively skipping arithmetic and other operations involving "0" values)).

In general, coarse-grained pruning at the kernel, node, or channel level (referred to herein in this example collectively as channel pruning) presents a challenge, as naively reducing the number of channels based on target sparsity may inadvertently lead to significant losses in accuracy, regardless of their filter or channel selection. For instance, a traditional pruning of the ResNet50 network (trained on ImageNet) that yields a 50% compression in parameters may result in a 1.4 to 1.1 drop in accuracy.

In an improved embodiment, a fast sensitivity pruning technique may be utilized to quickly identify the sensitivity of each layer in a network for a given accuracy tolerance. The following pseudocode illustrates one example implementation of such a fast sensitivity pruning technique:

| Algorithm 1 - Fast sensitivity test for channel pruning |  |
| --- | --- |
| Input: | Validation data and a dense model M. |
| Output: | Pruning percentage for each layer in the model M. |
| 1: | Threshold accuracy = original dense accuracy - accuracy tolerance (e.g. 3 - 5%) |
| 2: | for each layer in the model M do |
| 3: |     sort output channels based on the sum of absolute weight values |
| 4: |     for sparsity percentage in between 30% - 80% do |
| 5: |         channel-wise mask is created based on the current sparsity percentage |
| 6: |         accuracy = Forward the network with channel x mask |
| 7: |         if accuracy > Threshold accuracy then |
| 8: |             continue; |
| 9: |         else |
| 10: |             Record the per-layer percentage and exit the for loop |
| 11: |     end for |
| 12: | end for |

Sensitivity based channel pruning may seek to identify the upper bound in the percentage of the number of intact output channels in each layer with acceptable accuracy loss, with the potential loss in accuracy recoverable with fine-tuning of the percentage of pruned channels. When the neural network model is damaged too dramatically through pruning, it becomes more difficult to recover its accuracy. To define how much accuracy loss is too much, an accuracy tolerance may be defined for the neural network (which may be based on the data set on which the original, dense version of the neural network was trained (e.g., an accuracy tolerance of 3 to 5% for ResNet50 on ImageNet). This accuracy tolerance may be provided with or identified in response to a request to prune a particular neural network, among other example embodiments.

Figure 5A:
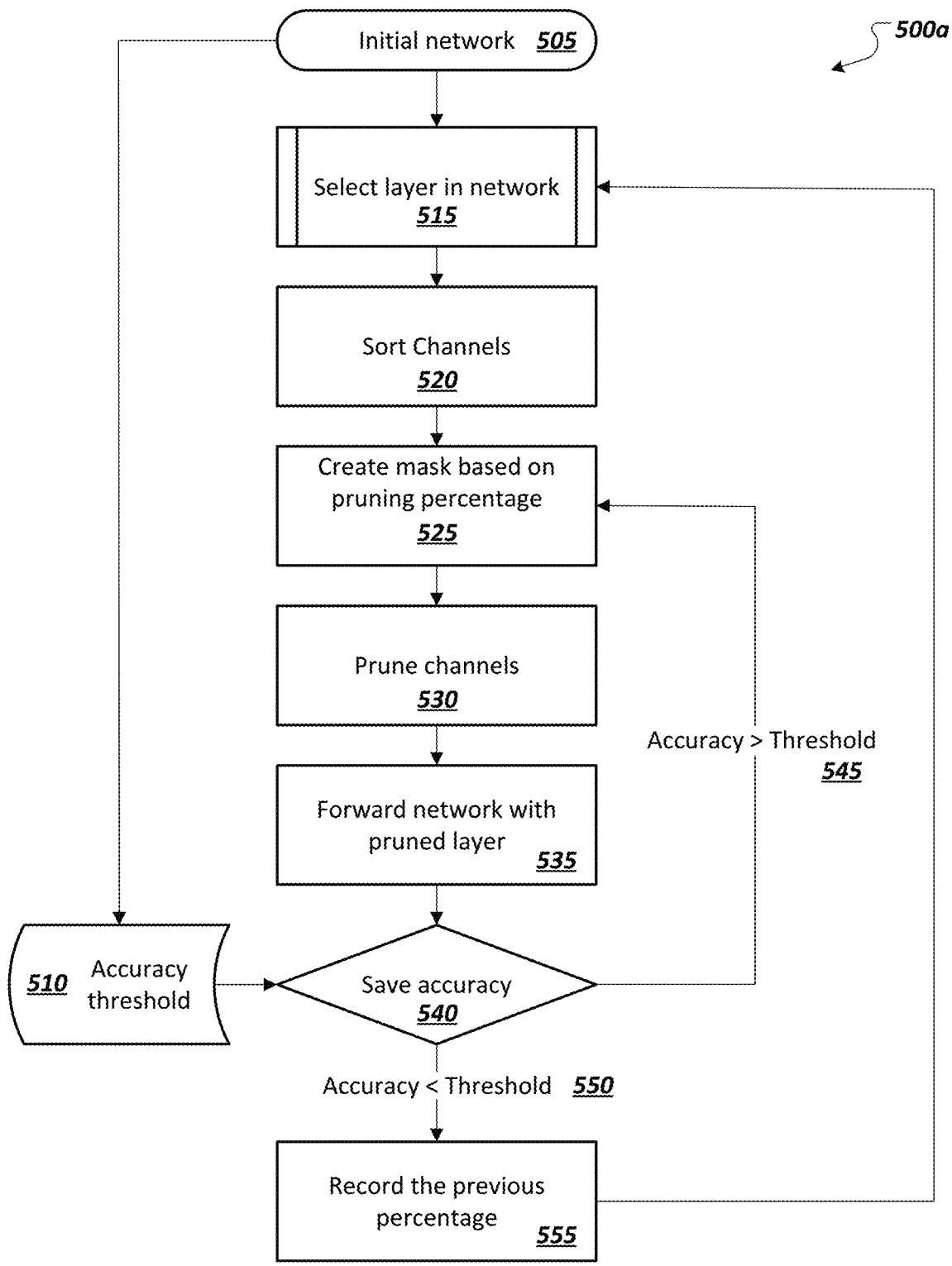
FIG. 5A is a flow diagram of an example coarse-grained pruning stage.

FIG. 5A is a flowchart 500a illustrating performance of fast sensitivity-based channel pruning, such as may be performed in connection with a hybrid pruning of an example neural network model. An initial, dense neural network may be identified 505 and accessed for pruning performed using a neural network pruner tool. An accuracy threshold may be defined that is specific to the neural network or neural networks of a particular type, and this accuracy threshold (at 510) may be utilized during sensitivity testing performed with the coarse-grained pruning stage of a hybrid pruning. Coarse-grained pruning may be conducted on a per layer basis. In some cases, coarse-grained pruning may be performed on multiple layers of a particular target neural network in parallel, utilizing parallel processing and other computing techniques. The channels of the selected layer may be identified and sorted 520. In one implementation, the channels in a layer may be sorted based on the respective sum of the absolute values of the weights in the channel. Such a sorting may effectively rank order the channels of the layer based on the relative importance or sensitivity of that channel.

Continuing with the example of FIG. 5A, an initial prune may be defined such that a particular starting percentage of channels is identified for pruning. Any non-zero starting percentage may be set during configuration of the pruner tool. For instance, in an initial prune, 30% of the lowest ranked channels (e.g., those with the lowest aggregate weights) may be selected for pruning and a mask may be generated 525 based on this pruning percentage and the sorting 520. The channels may then be pruned 530 according to the mask to generate a pruned version of the layer. A pruned version of the neural network may then be likewise generated that includes the pruned version of this layer (with all other layers having their original density). The pruned version of the neural network may then be caused to be implemented on a computing platform and tested 535 against a set of test input data to determine what affect this initial pruning of the particular layer has on the overall accuracy of the neural network model. If the pruned version of the neural network has an accuracy that is within an acceptable range or above an acceptable threshold set for the pruning (at 510), then the pruning steps for the particular layer are repeated 545 to attempt to further prune channels from the particular layer. If, however, the initial prune results in the accuracy falling below the threshold, the initial percentage, in some cases, may be decreased and the pruning steps repeated based on this lower percentage. In other cases, if the accuracy falls below the threshold after the initial prune, it may be determined that the layer should not be pruned. In either instance, following the sensitivity test of the neural network with the initially pruned version of the layer (e.g., by performing a forward-propagation of the modified network) the resulting accuracy or accuracy change may be recorded, along with data describing the pruned version of the particular layer used during the test.

Continuing with the foregoing example, if it is determined during the test (at 535) that the initial prune of a layer allows the neural network to still retain sufficient accuracy, the initial pruning percentage may be increased (e.g., incremented (e.g., by 5%, 10%, etc.)) by the pruner tool and a new mask may be created (at 525) to prune an additional number of channels from the layer according to the incremented percentage. For instance, in one example, the pruning percentage may be incremented by 10% to bring the pruning percentage to 40%. A corresponding mask may be created and the next 10% of the sorted channels may be pruned to bring the number of pruned channels to 40%. A version of the neural network may then be generated and tested that includes the 40%-pruned version of the particular layer. If the accuracy of the pruned neural network again remained above the threshold, the pruning percentage may be again incremented and the steps repeated until the observed accuracy of the test falls below the accuracy threshold. When the test reveals that a pruned version of the layer results in the accuracy of the neural network falling below the threshold (e.g., at 550), the last version of the layer (with a corresponding percentage of pruned channels) which resulted in tested accuracy of the neural network being above the accuracy threshold may be recorded 555 as the version of the layer that is to be adopted in the pruned neural network. As an illustrative example, after determining that a 40% prune of channels in a particular layer keeps the neural network above the defined accuracy threshold, a further prune may be attempted, pruning 50% of the channels. However, when the neural network is tested with the particular layer pruned at 50% it may be determined that accuracy of the network falls below the accuracy threshold. Accordingly, in this illustrative example, the 40%-pruned version of the particular layer may be adopted as the resulting coarse-grained prune of the particular layer.

In one implementation of coarse-grained pruning, each layer of the neural network may be pruned and sensitivity tested independently. For instance, when testing a prune of any given layer in the network, the tested version of the network is to isolate the layer being pruned, such that all other layers in the tested network retain the number of channels as defined in the original version of the neural network. As an illustrative example, after determining (through a sensitivity test) that channels in a first hidden layer in the neural network can be pruned up to 40% without causing the network to fall below the threshold accuracy, a second one of the hidden layers can be pruned and tested (e.g., as outlined in the process illustrated in the example of FIG. 5A). When a pruned version of the second layer is to be sensitivity tested, however, the tested version of the neural network is to only include the pruned version of the second layer (i.e., and not also the pruned version of the first layer)—the first layer, in this example, would be implemented as in the original version of the neural network, so as to isolate analysis of the proposed pruning of the second layer. Such layer-by-layer pruning and testing may continue until all of the layers (that are designated for pruning) have been pruned. At this point, a pruned version of the neural network may then be generated which includes all of the pruned versions of the layers.

In some implementations, for any layer to be pruned during coarse-grained pruning, upon determining the target percentage of channels to prune from a layer of the network, the number of pruned channels may be simply determined by multiplying the number of original channels in the layer by the determined percentage and rounded up or down if the number of channels is a non-integer value. In some implementations, the number of preserved (i.e., unpruned) channels may be rounded up or down to a number corresponding to the architecture of the system that is to use and perform calculations based on the neural network model. For instance, the preserved channels may be selected to be a number corresponding to the number of multiply-accumulate (MAC) circuits, the number of cores, or another number corresponding to a hardware architecture (e.g., by rounding the number of unpruned channels in a given layer up or down such that it is a multiple of 4, 8, 16, etc.).

During the pruning and sensitivity testing of any given layer during coarse-grained pruning, the percentage of the prune determined from the sensitivity test indicates the break point for each layer. To be more specific, from the forward pass performed during the test, it may be determined that pruning a given layer beyond a particular percentage will cause the accuracy of the overall neural network model to drop unacceptably. While aggressive pruning may reduce the size of the neural network, this can lead to longer fine-tuning and repair processes for the pruned model. In some cases, accuracy may not be able to be restored following such aggressive pruning.

Among other example benefits and advantages, coarse-grained pruning through the sensitivity testing approach described above may be less computationally expensive and time consuming as other pruning solutions. For instance, it should be appreciated that each version of the neural network model that is to be iteratively tested in the sensitivity test (with a respective pruned version of a single one of the model layers) does not need to be retrained (i.e., beyond the training completed for the original, initial model. Such tests may thereby be completed quickly with only modest computing resources (e.g., 8.86 minutes on 1-CPU Intel Core i7-6850K CPU and 3.38 seconds on GPU GTX-1080-Ti Pascal for sensitivity tests on ResNet50 on ImageNet), among other examples. Accordingly, a sensitivity test approach may enable coarse-grained channel pruning that does not require training to determine important channels in each layer and across layers. Sensitivity testing can be performed during inference time and may only requires a few minutes to run.

Figure 5B:
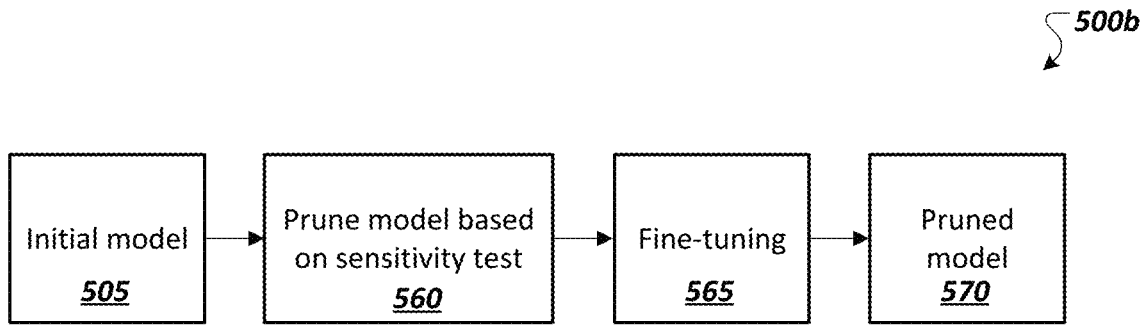
FIG. 5B is a diagram of an example neural network pruning pipeline.

Turning to FIG. 5B, a flow diagram 500b is shown illustrating a pipeline for generating a pruned version of a neural network from coarse-grained pruning performed by a pruner tool. For instance, beginning with an initial, unpruned or dense version of a neural network model 505, sensitivity-test-based coarse-grained pruning may be performed 560 (such as described in the example of FIG. 5A). With all of the target layers now pruned (e.g., on a channel-, kernel-, or neuron-wise basis), a pruned version of the neural network may be formed from the determined layers and may be fine-tuned and retrained 565. Fine-tuning 565 is used to restore, to the degree possible, the pruned model to original model performance. When this fine-tuning 565 is completed, the pruned (or thinned or sparse) neural network model is ready for use and deployment on target computing systems (e.g., resource-constrained computing systems).

In the case of hybrid pruning, an additional fine-grained pruning step may be performed to further reduce the size and complexity of the model following the completion of coarse-grained channel pruning. In one example, fine-grained pruning may be performed in connection with the training or fine-tuning of the pruned network resulting from a preceding coarse-grained prune. In one example, statistics-aware weight pruning may be performed for fine-grained weight pruning. For instance, a layer-wise weight threshold may be computed based on the statistical distribution of full dense weights in each channel-pruned layer and weight pruning may be performed to mask out those weights that are less than the corresponding layer-specific threshold.

Figure 5C:
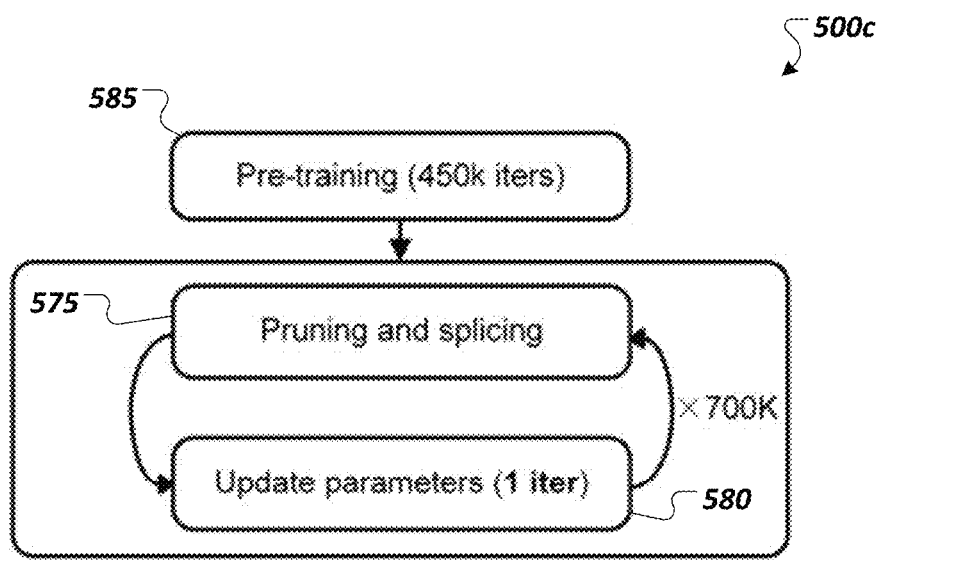
FIG. 5C is a diagram of an example fine-grained weight pruning stage.

As illustrated in the example of FIG. 5C, in some implementations, fine-grained pruning may be performed to include a pruning operation and a splicing operation, similar to the dynamic network surgery described in Dynamic Network Surgery for Efficient DNNs, by Yiwen Guo et al. In one example, fine-grained weight pruning may be performed during forward propagation in training of a network, while splicing (or restoring previously pruned channels) may be performed during back propagation. Weight pruning may be performed when a given weight's value falls below a threshold value, thereby causing the value to be reduced to zero. However, if the weight value evolves to be above the threshold value, the weight may be spliced, or restored. For instance, during training pruning and splicing 575 may be performed. After each training iteration, the weight parameters may be updated 580, and the next iteration of training performed with corresponding pruning and splicing 575, and so on until the network stabilizes. In some implementations, a pre-training stage 585 may be performed prior to beginning weight pruning, among other example implementations.

In one example, after course-grained channel pruning is performed to reduce the size of the layer, fine-grained weight pruning may be performed to further reduce the size and computational footprint of the network. In one example, statistics-aware weight pruning may be performed for fine-grained weight pruning. For instance, a layer-wise weight threshold may be computed based on the statistical distribution of full dense weights in each channel-pruned layer and weight pruning may be performed to mask out those weights that are less than the corresponding layer-specific threshold. While some techniques define a single weight threshold for the entire network, in some implementations, a layer-specific weight threshold may enhance the speed of the pruning and accuracy of the resulting pruned network. In some instances, the threshold may be determined based on a descriptive statistic value describing weight values within the layer (e.g., a mean, median, mode, standard deviation, variance, etc. of the weight values of a layer). For instance, a layer-specific weight value may be determined from both the mean of the absolute values of weights in the coarse-grain-pruned layer and the standard deviation of the absolute values of weights in the coarse-grain-pruned layer, among other examples.

In one example implementations, a layer-wise mask$_l^n$ may be defined to represent the binary mask governing which weights to prune during any given training iteration, for an $l^{th}$ layer at $n^{th}$ iteration, as shown, for instance, in Equation 1 (590). This binary mask is dynamically updated in each iteration of training based on the threshold that is computed from the mean and standard deviation of the weights in each layer with sparsity level controlling factor σ (σ is the same for all the layers). In this example, fine-grained weight pruning may be performed by sparsifying weights (preserving or forcing to zero the value of the weight based on a comparison with a threshold weight value) in the forward pass according to the mask and full dense weights are updated with the gradients computed with sparse weights during training, thereby allowing previously pruned weights back (through splicing) if it is revealed, during training iterations, that the weight has become more important to the outcome of the network (e.g., when $|W_l^n(i,j)|>t_l^n$). Such layer-specific thresholds result in pruned network models that may generally perform better than neural network models sparsified using the same sparsity level across all layers, among other example benefits.

$$mask_l^n(i, j) = \begin{cases} 0 & \text{if } |W_l^n(i, j)| < t_l^n \\ 1 & \text{if } |W_l^n(i, j)| \geq t_l^n \end{cases} \quad (1)$$

$$t_l^n = \text{mean}(|W_l^n|) + \text{std}(|W_l^n|) \times \sigma$$

As discussed above, an improved approach to neural network pruning can enable efficient pruning of network models to allow the model size, related computation consumption, and power consumption to drop, thereby allowing large modern networks to be adapted for and deployed onto limited-resource mobile devices, wearable devices, embedded devices, and other computing systems without significant degradation of the network accuracy. Additionally, an improved and efficient layer-wise channel pruning sensitivity test technique may be utilized to perform coarse-grained pruning of convolutional neural networks. This fast sensitivity test can ensure pruning of a sufficient amount of channels for the target networks without a significant accuracy drop from that of the initial neural network model, which further results in the fine-tuning stage for the pruned model being much simpler and more efficient than in naive channel pruning approaches. Further, a sensitivity test-based pruning approach does not require any training process to identify the importance of each channel in each layer, with all the sensitivity tests in the coarse-grained pruning stage run in the inference time. Further, such an approach is agnostic to the model architecture (i.e., it can be used on potentially any CNN). Furthermore, any degree of pruning granularity may be utilized to easily control the percentage of pruned channels by us using channel pruning masks which can target the best performance on certain hardware. This coarse-grained pruning approach may be further enhanced by combining the approach with a fine-grained pruning stage, to further reduce and simplify the neural network model.

Figure 6:
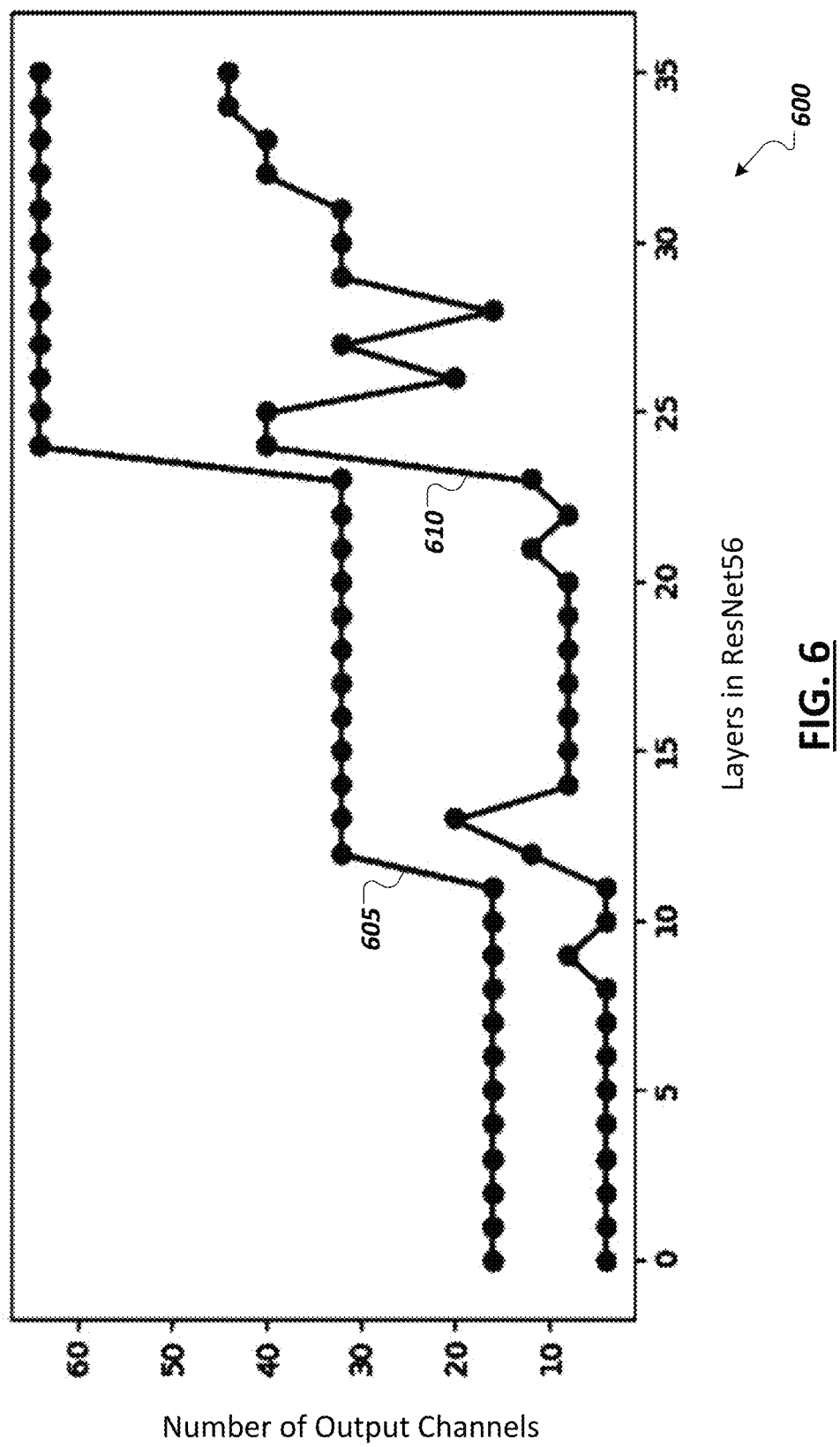
FIG. 6 is a graph illustrating a pruning of an example neural network model.
Figure 7:
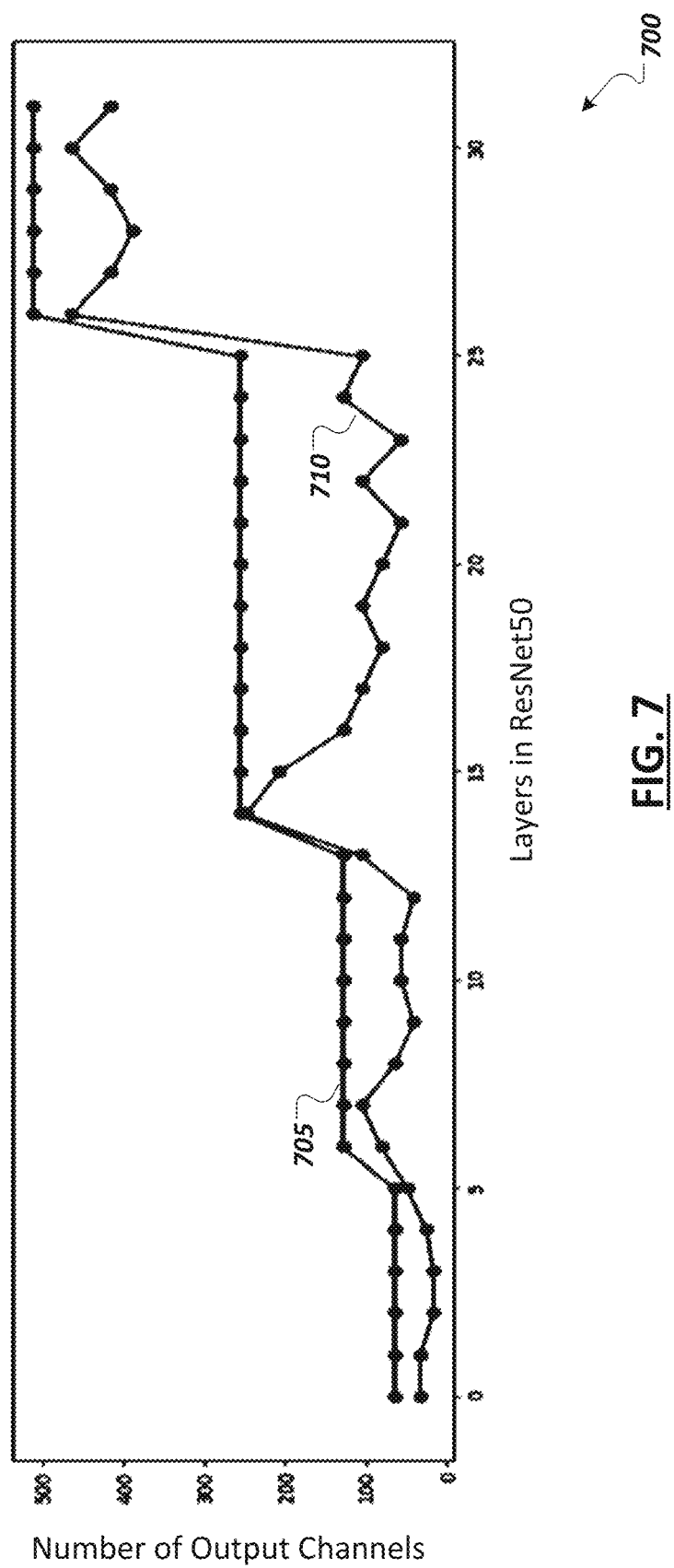
FIG. 7 is a graph illustrating a pruning of another example neural network model.

Turning to FIGS. 6-7, graphs 600, 700 are shown illustrating performance of example pruned neural networks pruned utilizing hybrid pruning techniques such as described herein. For instance, in FIG. 6, hybrid pruning is performed on a (bottleneck based) ResNet56 network model trained on Cifar10. In this example, sensitivity test-based coarse-grained pruning is performed (e.g., as discussed above) and first convolutional layer, last fully connected layer, and the last layer in each residual block are omitted for clarity (e.g., since these layers are intact and do not contain much computation compared to the original version of the network). Graph 600 shows a comparison of the number of channels per layer in the original network (shown by curve 605) with the number of channels remaining in the pruned version of the network (shown by curve 610). In this example, the surviving channels in each layer are determined from the sensitivity test with an accuracy tolerance of 2% defined for the pruning. Further, in this example, channel rounding is applied during coarse-grained pruning such that the surviving channels in each layer are a multiple of 4 for optimal hardware utilization. As shown in this example, most of the layers are capable of being pruned up to 75% with no significant loss in accuracy. It is also observed that those few layers that have increased output channels (compared to previous layer) are more sensitive. After achieving 2.4× instant speedup based on channel pruning, the hybrid pruning in this example results in a final 4.5× reduction in parameters (additional 1.8× reduction on thinner ResNet56) with less than a 1% accuracy drop. Hybrid pruning, in this example, is only applied on the convolutional layers to boost the model to 78% sparsity and it can be further pruned by applying weight pruning on the fully connected layer(s), among other examples.

Turning to FIG. 7, graph 700 shows output channels (at 705) of a pruned ResNet50 network trained using ImageNet compared with the number of channels (at 710) of the original unpruned version of the network. The experiment was intended for 2×MAC reduction based on the sensitivity test with a constraint of channels be multiple of 8. It is observed that, similar to the example of FIG. 6, those few layers that have increased output channels (compared to previous layer) are more sensitive. Interestingly, unlike the ResNet56 example of FIG. 6, the last few layers that have the most number of channels are also sensitive. From this observation, it can be inferred that although network structures may look similar, each network may nonetheless have different sensitivity, with sensitivity potentially varying across layers within a network, demonstrating the benefits of layer-wise pruning. In addition to parameter storage and bandwidth savings, both key for edge devices and resource constrained system, a hybrid-pruned model can further boost the performance when deployed on hardware with sparse matrix support.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 8-16 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 8-16.

Figure 8:
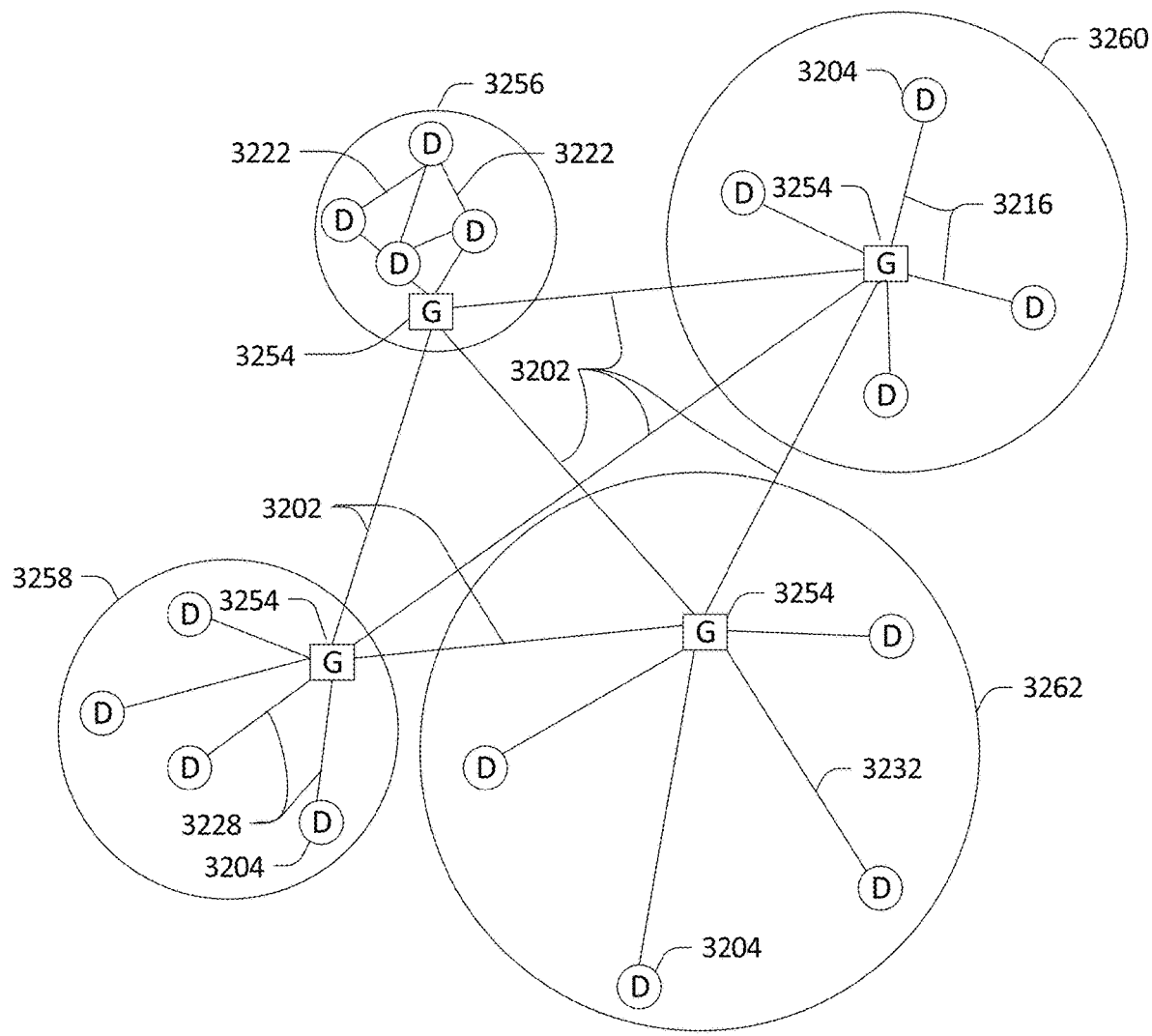
FIG. 8 is a simplified block diagram of an exemplary network with devices in accordance with at least some embodiments.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
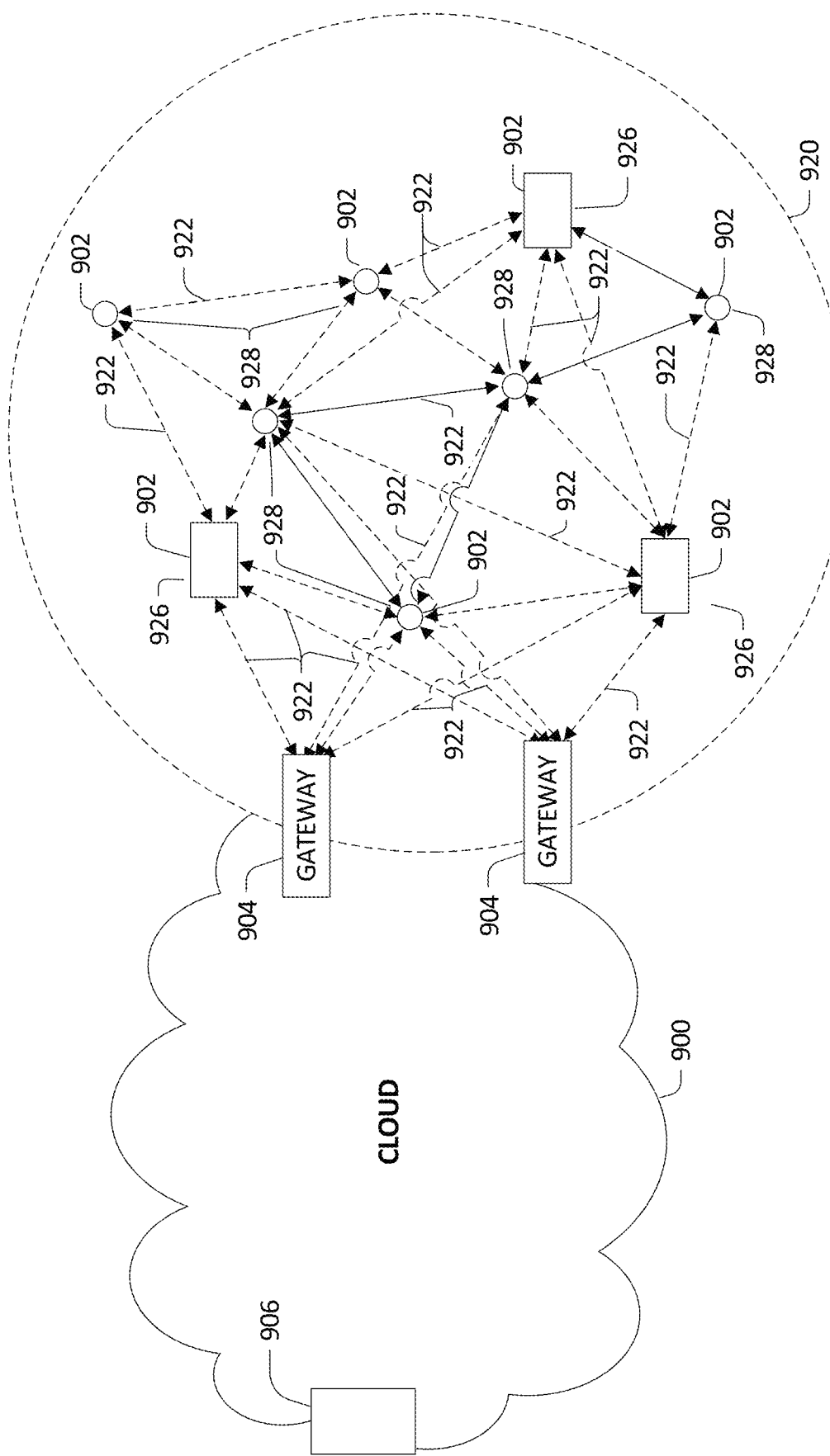
FIG. 9 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms.

For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 10:
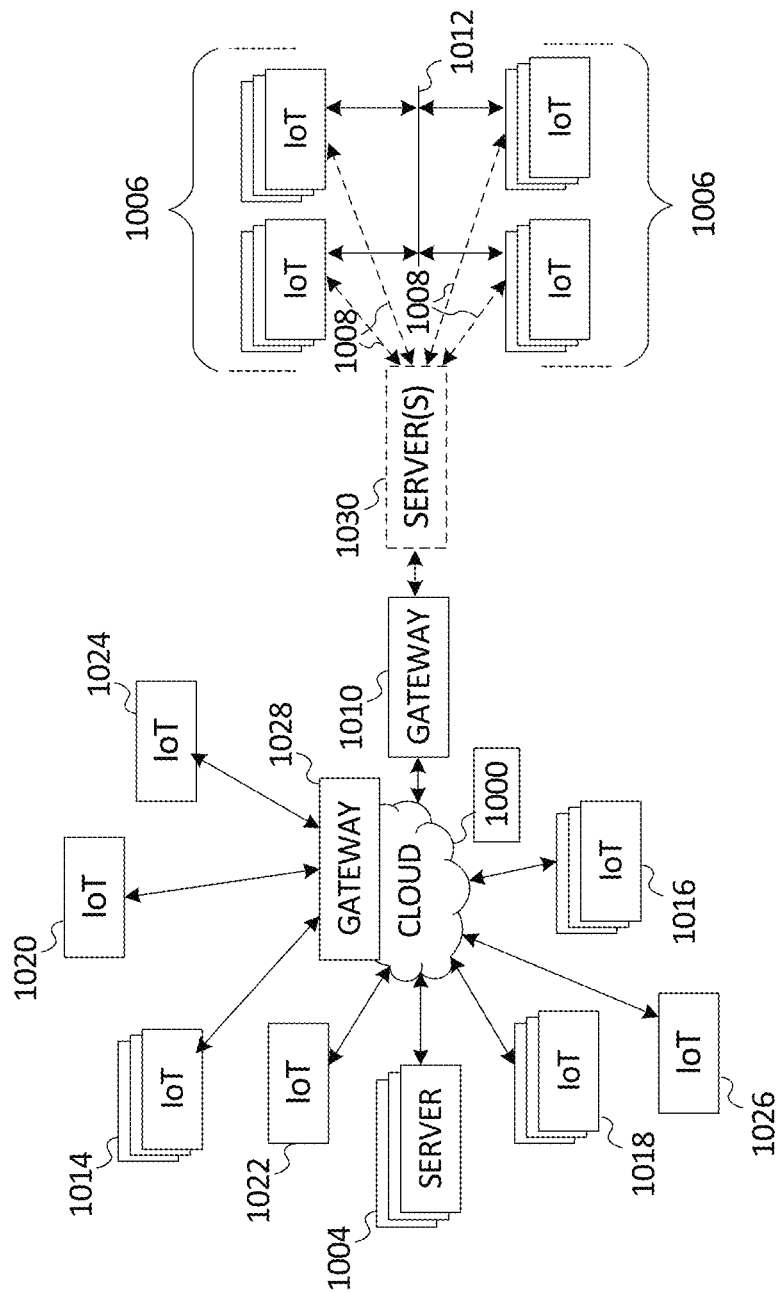
FIG. 10 is a simplified block diagram of a system including example devices in accordance with at least some embodiments.

For instance, FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
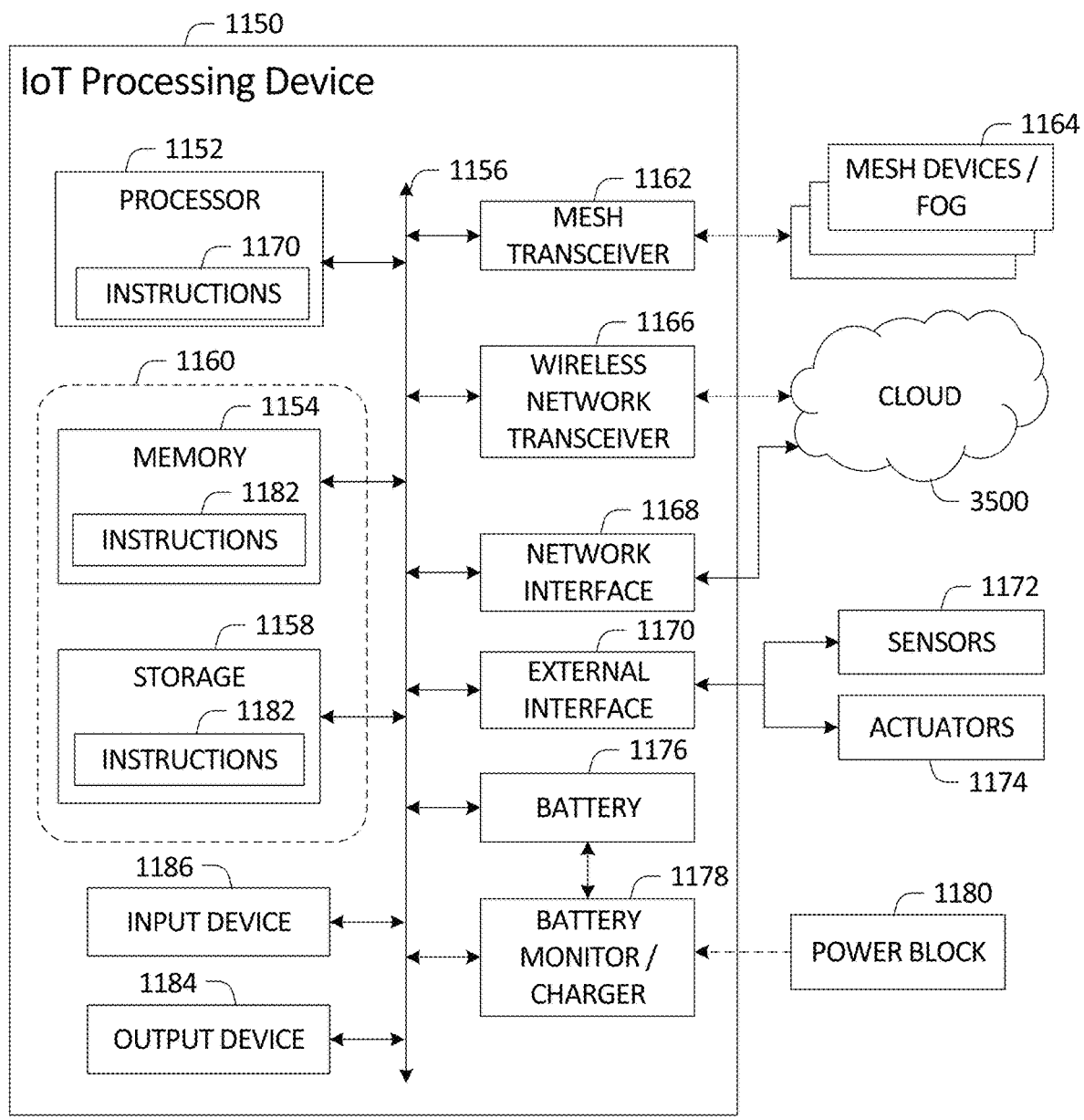
FIG. 11 is a simplified block diagram of an example processing device in accordance with at least some embodiments.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, California, among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram (s) of operations and functionality depicted above.

Figure 12:
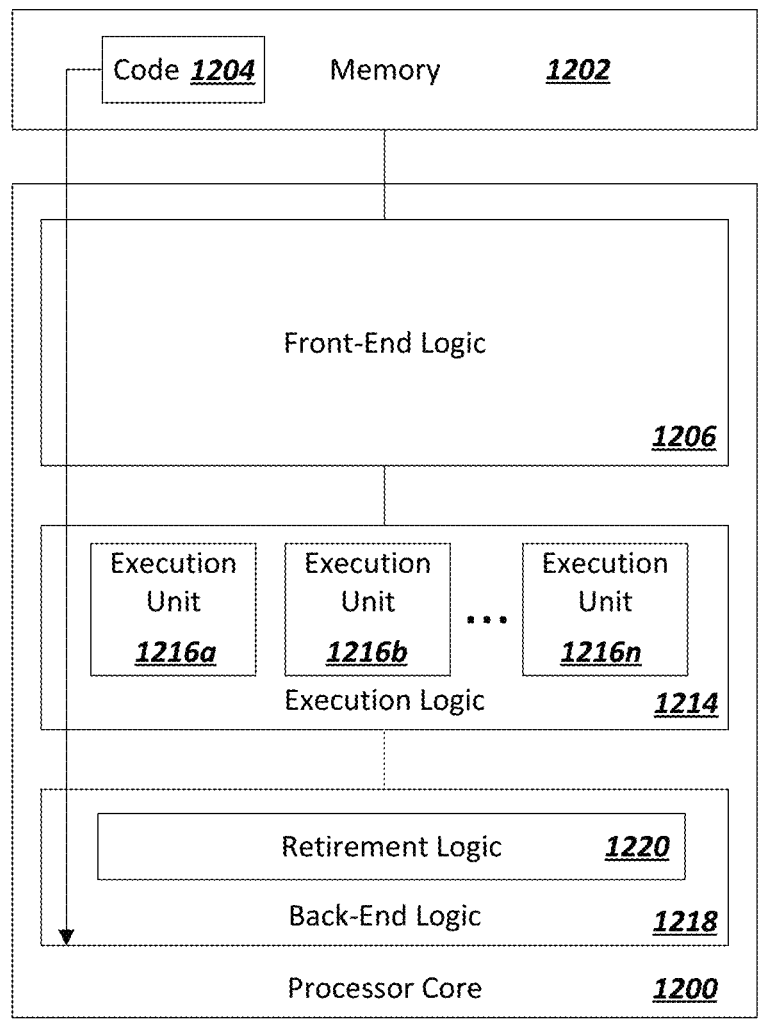
FIG. 12 is a block diagram of an exemplary processor in accordance with at least some embodiments.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216*a*, 1216*b*, 1216*n*, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

Figure 13:
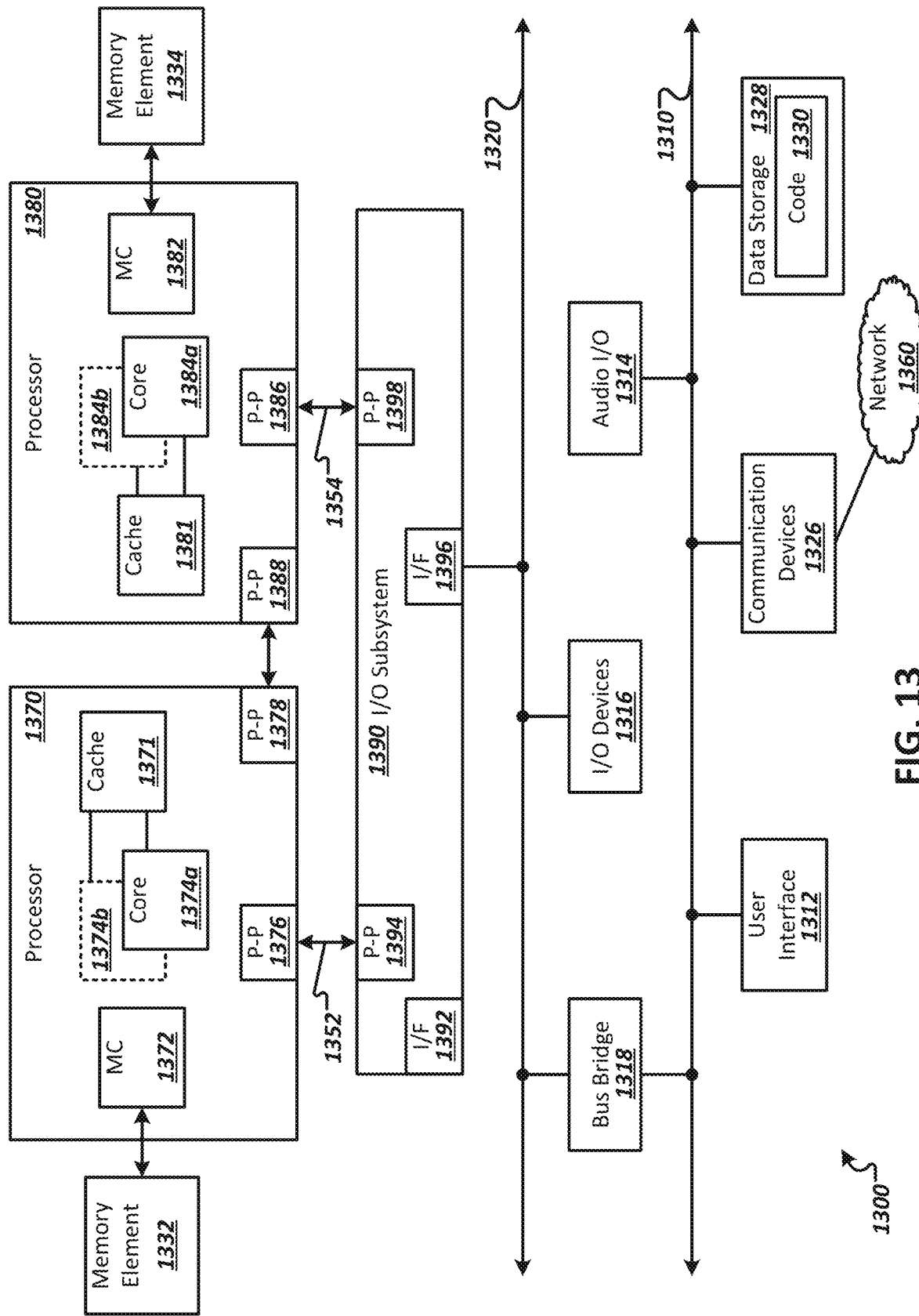
FIG. 13 is a block diagram of an exemplary computing system in accordance with at least some embodiments.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

Figure 14:
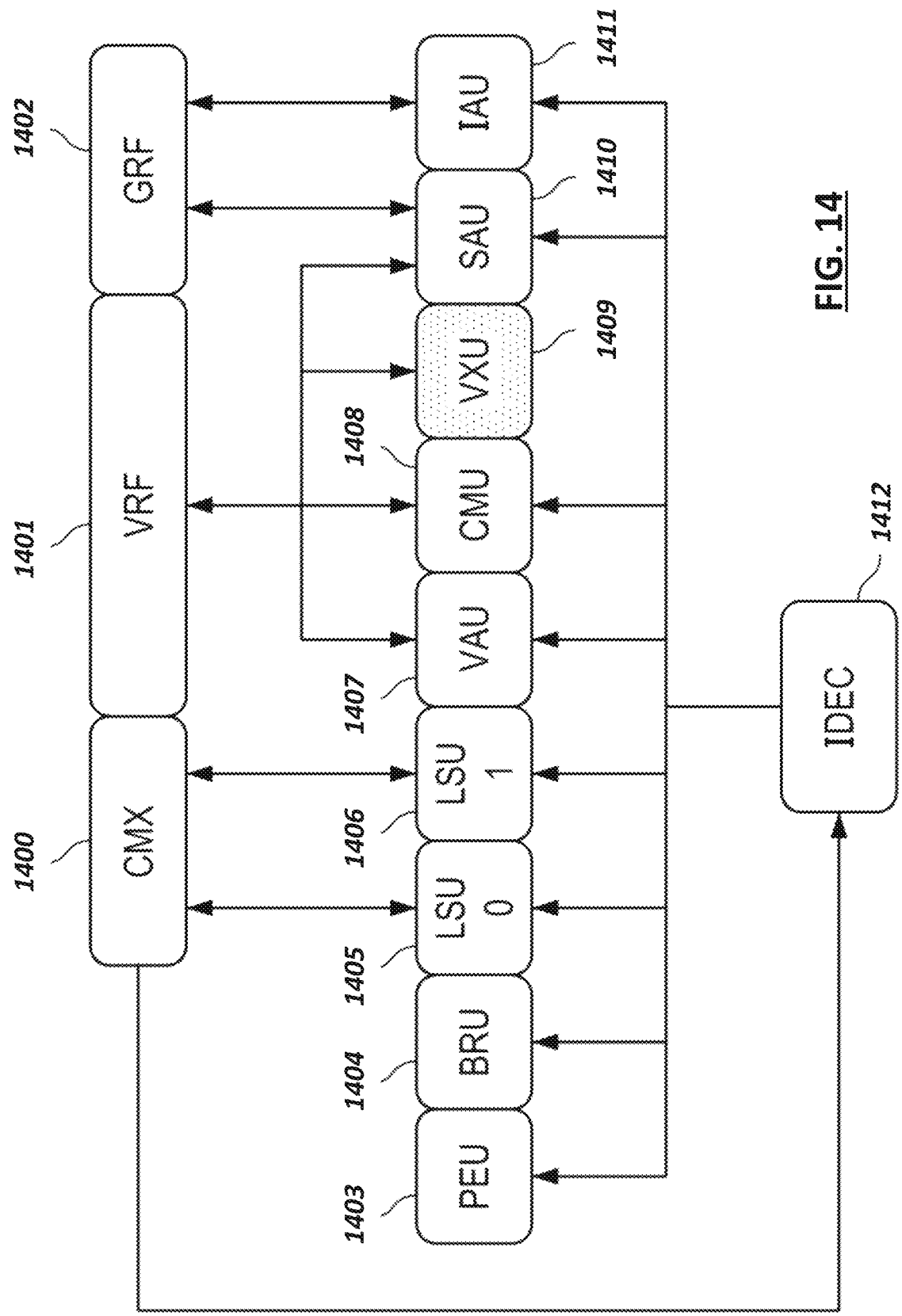
FIG. 14 depicts an example multi-slot vector processor in accordance with some embodiments.

FIG. 14 is a simplified block diagram representing an example multislot vector processor (e.g., a very long instruction word (VLIW) vector processor) in accordance with some embodiments. In this example the vector processor may include multiple (e.g., 9) functional units (e.g., 1403-1411), which may be fed by a multi-ported memory system 1400, backed up by a vector register file (VRF) 1401 and general register file (GRF) 1402. The processor contains an instruction decoder (IDEC) 1412, which decodes instructions and generates control signals which control the functional units 1403-1411. The functional units 1403-1411 are the predicated execution unit (PEU) 1403, branch and repeat unit (BRU) 1404, load store port units (e.g., LSU0 1405 and LSU1 1406), a vector arithmetic unit (VAU) 1407, scalar arithmetic unit (SAU) 1410, compare and move unit (CMU) 1408, integer arithmetic unit (IAU) 1411, and a volumetric acceleration unit (VXU) 1409. In this particular implementation, the VXU 1409 may accelerate operations on volumetric data, including both storage/retrieval operations, logical operations, and arithmetic operations. While the VXU circuitry 1409 is shown in the example of FIG. 14 as a unitary component, it should be appreciated that the functionality of the VXU (as well as an of the other functional units 1403-1411) may be distributed among multiple circuitry. Further, in some implementations, the functionality of the VXU 1409 may be distributed, in some implementations, within one or more of the other functional units (e.g., 1403-1408, 1410, 1411) of the processor, among other example implementations.

Figure 15:
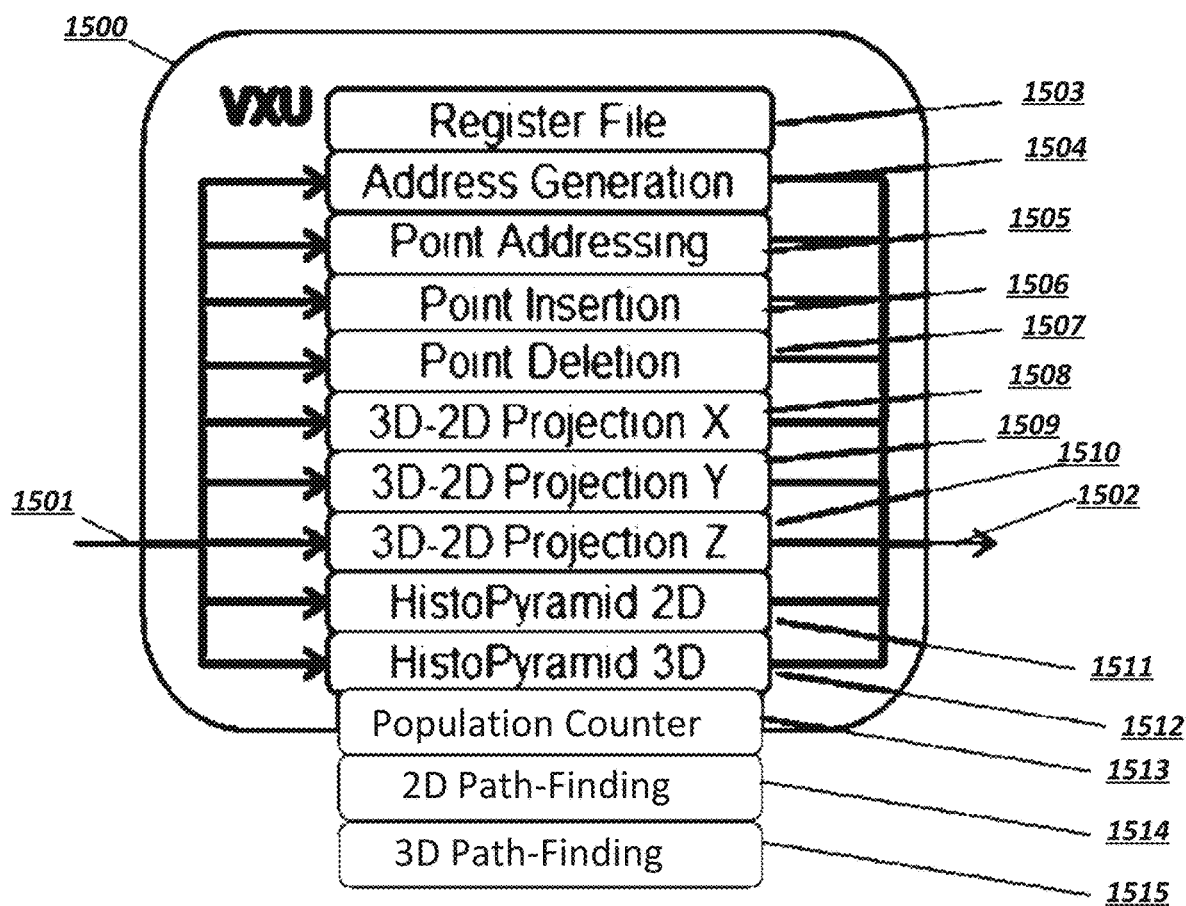
FIG. 15 illustrates an example volumetric acceleration hardware in accordance with some embodiments.

FIG. 15 is a simplified block diagram illustrating an example implementation of a VXU 1500 in accordance with some embodiments. For instance, VXU 1500 may provide at least one 64-bit input port 1501 to accept inputs from either the vector register file 1401 or general register file 1402. This input may be connected to a plurality of functional units including a register file 1503, address generator 1504, point addressing logic 1505, point insertion logic 1506, point deletion logic 1507, 3D to 2D projection logic in X dimension 1508, 3D to 2D projection logic in Y dimension 1509, 3D to 2D projection logic in X dimension 1510, 2D histogram pyramid generator 1511, 3D histopyramid generator 1512, population counter 1513, 2D path-finding logic 1514, 3D path-finding logic 1515 and possibly additional functional units to operate on 64-bit unsigned integer volumetric bitmaps. The output from the block 1502 can be written back to either the vector register file VRF 1401 or general register file GRF 1402 register files.

Figure 16:
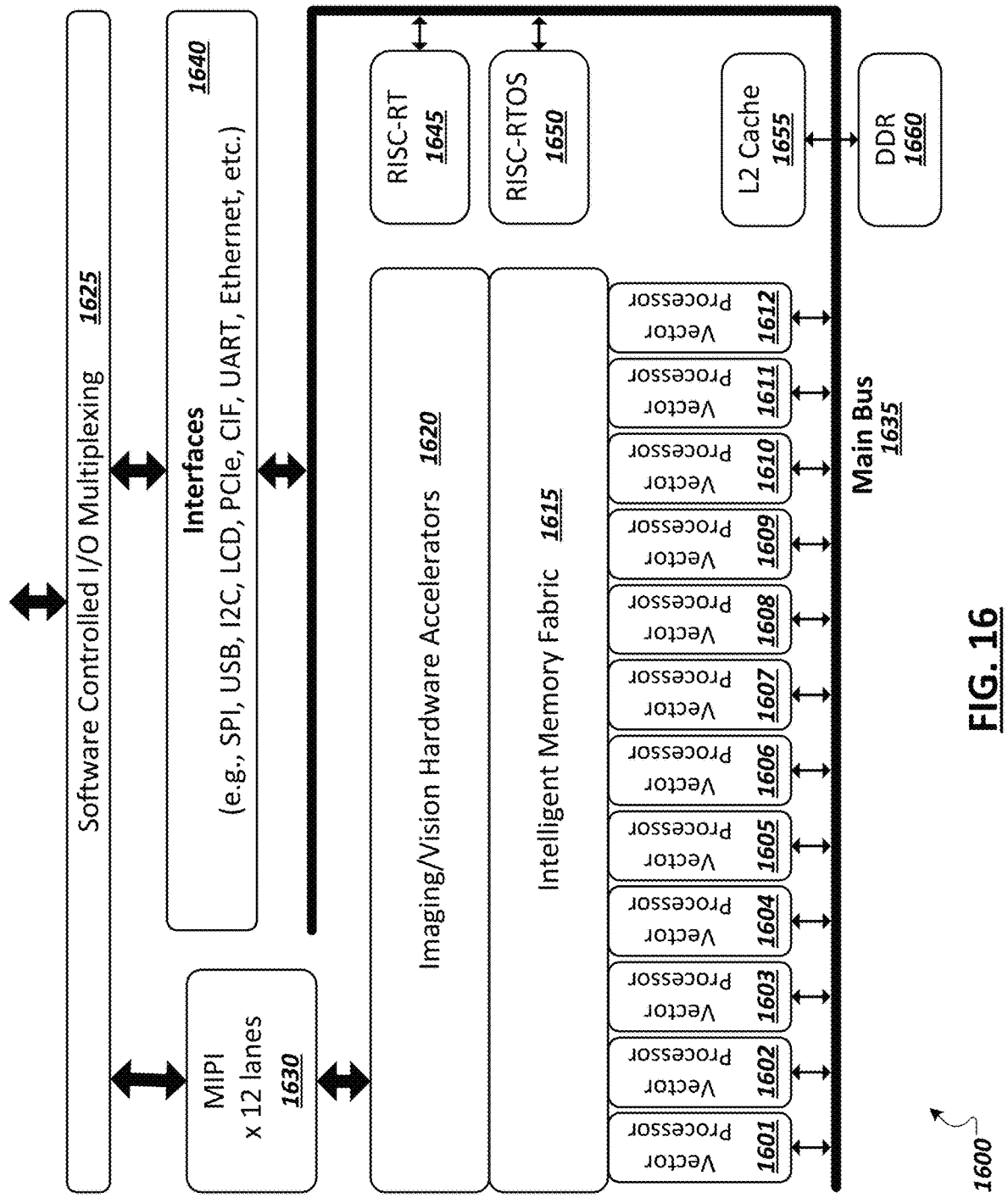
FIG. 16 illustrates an example vision processing unit (VPU) in accordance with some embodiments.

FIG. 16 is a simplified block diagram 1600 illustrating an example architecture of an example implementation of a vision processing unit (VPU) configured to accelerate machine vision operations and other machine learning applications. A VPU may be implemented as a system on chip with multiple vector processor cores (e.g., 1601-1612). The VPU may be configured specifically for handling neural network inferencing workloads, capable of handling trillions of deep neural network operations per second. An example VPU can further include imaging and machine vision hardware accelerators (e.g., 1620), which may be implemented as dedicated hardware accelerator onto which key vision workloads may be offloaded. Additional accelerators may also be provided, such as a neural compute engine—a dedicated hardware accelerator for running on-device deep neural network applications. An intelligent memory fabric 1615 can interconnect the vector processors (e.g., 1601-1612) and hardware accelerators through an ultra-high throughput fabric. Additional interconnects may be provided such as a MIPI lanes 1630 to connect to a software-controlled I/O multiplexing block 1625, and a main bus 1635 coupling each of the vector processors 1601-1612 with interface logic 1640 (e.g., providing various interfaces according to various interconnect protocols, as well as DDR memory 1660, L2 cache 1655, as well as reduced instruction set computer (RISC) blocks 1645, 1650, among other example components. In some instances, an example VPU may include hardware logic and architecture to enable the VPU to identify and more efficiently handle operations involving scarce data sets (e.g., data sets with many zeros or nulls, such as a pruned neural network), among other example features.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: access data including a definition of a neural network, where the neural network includes a plurality of layers, and each of the layers includes a respective set of channels; determine pruned versions of each of the plurality of layers, where determining the pruned version of a respective layer includes: sorting the set of channels of the layer based on respective weight values of each channel in the set of channels; pruning a first percentage of the set of channels based on the sorting to form a thinned version of the layer; providing input data to a thinned version of the neural network in a test, where the thinned version of the neural network includes the thinned version of the layer; determining accuracy of the thinned version of the neural network based on an output of the neural network in the test; and adopting the thinned version of the layer to generate the pruned version of the layer based on the accuracy of the thinned version of the neural network exceeding a threshold accuracy value. The instructions, when executed, further causes the machine to generate a pruned version of the neural network to include the respective pruned versions of each of the plurality of layers.

Example 2 includes the subject matter of example 1, where generating the pruned version of at least a subset of the plurality of layers includes performing weight pruning on a corresponding thinned version of the layer in the subset.

Example 3 includes the subject matter of example 2, where performing the weight pruning on a respective thinned version of one of the subset of layers includes: determining a respective descriptive statistic value from weights of the thinned version of the layer; determining a respective weight threshold for the thinned version of the layer based on the respective descriptive statistic value; and pruning weights in the thinned version of the layer with values below the respective weight threshold for the layer to generate the pruned version of the layer.

Example 4 includes the subject matter of any one of example 3, where the at least one of the thinned versions of the plurality of layers includes a plurality of the thinned versions of the plurality of layers, the weight threshold determined for a first one of the plurality of layers is different from the weight threshold determined for a second one of the plurality of layers.

Example 5 includes the subject matter of any one of examples 3-4, where the descriptive statistics value includes a mean of the absolute values of the weights of the thinned version of the layer and a standard deviation of the absolute values of the weights of the thinned version of the layer.

Example 6 includes the subject matter of any one of examples 1-5, where the neural network includes additional layers outside the plurality of layers and the additional layers are unpruned in the pruned version of the neural network.

Example 7 includes the subject matter of any one of examples 1-6, where the neural network is pre-trained neural network using a particular data set, and the input data corresponds to the particular data set.

Example 8 includes the subject matter of any one of examples 1-7, where the test includes performing forward propagation on the thinned version of the neural network.

Example 9 includes the subject matter of any one of examples 1-8, where the channels are to be sorted based on the sum of absolute values of weights of the channel.

Example 10 includes the subject matter of any one of examples 1-9, where the thinned version of the layer generated through pruning the first percentage of the set of channels includes a first iteration of the thinned version of the layer, the thinned version of the neural network with the first iteration of the thinned version of the layer includes a first iteration of the thinned version of the neural network, and determining the pruned version of a respective layer further includes: determining that accuracy of the first iteration of the thinned version of the neural network exceeds the threshold accuracy value; pruning additional channels from the first iteration of the thinned version of the layer based on the sorting to form a second iteration of the thinned version of the layer; and testing accuracy of a second iteration of the thinned neural network, where the second iteration of the thinned neural network includes the second iteration of the thinned layer.

Example 11 includes the subject matter of example 10, where determining the pruned version of a respective layer further includes: determining that accuracy of the second iteration of the thinned version of the neural network falls below the threshold accuracy value; adopting the first iteration of the thinned version of the layer as the thinned version of the layer to be used to generate the pruned version of the neural network based on the accuracy of the second iteration of the thinned version of the neural network falling below the threshold accuracy value.

Example 12 includes the subject matter of any one of examples 1-11, where a respective iteration of the thinned neural network is generated to test thinned versions of each of the plurality of layers, and each iteration of the thinned neural network includes only one thinned version of the plurality of layers.

Example 13 includes the subject matter of any one of examples 1-12, where the neural network includes a convolutional neural network, and the plurality of layers include hidden layers of the convolutional neural network.

Example 14 includes the subject matter of any one of examples 1-13, where generating the pruned version of the layer includes rounding a number of unpruned channels to a multiple corresponding to a hardware architecture.

Example 15 includes the subject matter of example 14, where the hardware architecture includes hardware architecture of a resource constrained computing device.

Example 16 is a method including: accessing a neural network, where the neural network includes a plurality of layers, and each of the layers includes a respective set of channels; determining pruned versions of each of the plurality of layers, where determining the pruned version of a respective layer includes: sorting the set of channels of the layer based on respective weight values of each channel in the set of channels; iteratively pruning different-sized portions of the set of channels based on the sorting to form iterations of a thinned version of the layer; generating iterations of a thinned version of the neural network, where each iteration substitutes an original version of the layer with one of the iterations of the thinned version of the layer; testing each of the iterations of the thinned version of the neural network to determine whether accuracy of the iteration of the thinned version of the neural network exceeds a threshold accuracy value; determining that a particular iteration of the thinned version of the layer has a highest percentage of pruned channels amongst iterations of the thinned version of the layer included in iterations of the thinned version of the neural network tested to have an accuracy in excess of the threshold accuracy value; and using the particular iteration of the thinned version of the layer to generate the pruned version of the layer; and generating a pruned version of the neural network to include the respective pruned versions of each of the plurality of layers.

Example 17 includes the subject matter of example 16, where generating the pruned version of at least a subset of the plurality of layers includes performing weight pruning on a corresponding thinned version of the layer in the subset.

Example 18 includes the subject matter of example 17, where performing the weight pruning on a respective thinned version of one of the subset of layers includes: determining a respective descriptive statistic value from weights of the thinned version of the layer; determining a respective weight threshold for the thinned version of the layer based on the respective descriptive statistic value; and pruning weights in the thinned version of the layer with values below the respective weight threshold for the layer to generate the pruned version of the layer.

Example 19 includes the subject matter of any one of example 18, where the at least one of the thinned versions of the plurality of layers includes a plurality of the thinned versions of the plurality of layers, the weight threshold determined for a first one of the plurality of layers is different from the weight threshold determined for a second one of the plurality of layers.

Example 20 includes the subject matter of any one of examples 18-19, where the descriptive statistics value includes a mean of the absolute values of the weights of the thinned version of the layer and a standard deviation of the absolute values of the weights of the thinned version of the layer.

Example 21 includes the subject matter of any one of examples 16-20, where the neural network includes additional layers outside the plurality of layers and the additional layers are unpruned in the pruned version of the neural network.

Example 22 includes the subject matter of any one of examples 16-21, where the neural network is pre-trained neural network using a particular data set, and the input data corresponds to the particular data set.

Example 23 includes the subject matter of any one of examples 16-22, where testing the accuracy of iterations of thinned versions of the neural network includes performing forward propagation on the iterations of thinned versions of the neural network.

Example 24 includes the subject matter of any one of examples 16-23, where the channels are to be sorted based on the sum of absolute values of weights of the channel.

Example 25 includes the subject matter of any one of examples 16-24, where the neural network includes a convolutional neural network, and the plurality of layers include hidden layers of the convolutional neural network.

Example 26 includes the subject matter of any one of examples 16-25, where generating the pruned version of the layer includes rounding a number of unpruned channels to a multiple corresponding to a hardware architecture.

Example 27 includes the subject matter of example 26, where the hardware architecture includes hardware architecture of a resource constrained computing device.

Example 28 is a system including: a data processing apparatus; a memory element; and a network pruner tool. The network pruner tool is executable by the data processing apparatus to: access data including a definition of a neural network, where the neural network includes a plurality of layers, and each of the layers includes a respective set of channels; determine pruned versions of each of the plurality of layers, where determining the pruned version of a respective layer includes: sorting the set of channels of the layer based on respective weight values of each channel in the set of channels; pruning a first percentage of the set of channels based on the sorting to form a thinned version of the layer; providing input data to a thinned version of the neural network in a test, where the thinned version of the neural network includes the thinned version of the layer; determining accuracy of the thinned version of the neural network based on an output of the neural network in the test; adopting the thinned version of the layer to generate the pruned version of the layer based on the accuracy of the thinned version of the neural network exceeding a threshold accuracy value; and generate a pruned version of the neural network to include the respective pruned versions of each of the plurality of layers.

Example 29 includes the subject matter of example 28, further including an interface to provide the pruned version of the neural network to a computing device.

Example 30 includes the subject matter of example 29, further including the computing device, where the computing device includes a resource-constrained computing device.

Example 31 includes the subject matter of example 28, where determining the pruned version of a respective layer further includes performing weight-pruning to the adopted thinned version of the layer.

Example 32 includes the subject matter of any one of examples 28-31, where generating the pruned version of at least a subset of the plurality of layers includes performing weight pruning on a corresponding thinned version of the layer in the subset.

Example 33 includes the subject matter of example 32, where performing the weight pruning on a respective thinned version of one of the subset of layers includes: determining a respective descriptive statistic value from weights of the thinned version of the layer; determining a respective weight threshold for the thinned version of the layer based on the respective descriptive statistic value; and pruning weights in the thinned version of the layer with values below the respective weight threshold for the layer to generate the pruned version of the layer.

Example 34 includes the subject matter of any one of example 33, where the at least one of the thinned versions of the plurality of layers includes a plurality of the thinned versions of the plurality of layers, the weight threshold determined for a first one of the plurality of layers is different from the weight threshold determined for a second one of the plurality of layers.

Example 35 includes the subject matter of any one of examples 33-34, where the descriptive statistics value includes a mean of the absolute values of the weights of the thinned version of the layer and a standard deviation of the absolute values of the weights of the thinned version of the layer.

Example 36 includes the subject matter of any one of examples 28-35, where the neural network includes additional layers outside the plurality of layers and the additional layers are unpruned in the pruned version of the neural network.

Example 37 includes the subject matter of any one of examples 28-36, where the neural network is pre-trained neural network using a particular data set, and the input data corresponds to the particular data set.

Example 38 includes the subject matter of any one of examples 28-37, where the test includes performing forward propagation on the thinned version of the neural network.

Example 39 includes the subject matter of any one of examples 28-38, where the channels are to be sorted based on the sum of absolute values of weights of the channel.

Example 40 includes the subject matter of any one of examples 28-39, where the thinned version of the layer generated through pruning the first percentage of the set of channels includes a first iteration of the thinned version of the layer, the thinned version of the neural network with the first iteration of the thinned version of the layer includes a first iteration of the thinned version of the neural network, and determining the pruned version of a respective layer further includes: determining that accuracy of the first iteration of the thinned version of the neural network exceeds the threshold accuracy value; pruning additional channels from the first iteration of the thinned version of the layer based on the sorting to form a second iteration of the thinned version of the layer; and testing accuracy of a second iteration of the thinned neural network, where the second iteration of the thinned neural network includes the second iteration of the thinned layer.

Example 41 includes the subject matter of example 40, where determining the pruned version of a respective layer further includes: determining that accuracy of the second iteration of the thinned version of the neural network falls below the threshold accuracy value; adopting the first iteration of the thinned version of the layer as the thinned version of the layer to be used to generate the pruned version of the neural network based on the accuracy of the second iteration of the thinned version of the neural network falling below the threshold accuracy value.

Example 42 includes the subject matter of any one of examples 28-41, where a respective iteration of the thinned neural network is generated to test thinned versions of each of the plurality of layers, and each iteration of the thinned neural network includes only one thinned version of the plurality of layers.

Example 43 includes the subject matter of any one of examples 28-42, where the neural network includes a convolutional neural network, and the plurality of layers include hidden layers of the convolutional neural network.

Example 44 includes the subject matter of any one of examples 28-43, where generating the pruned version of the layer includes rounding a number of unpruned channels to a multiple corresponding to a hardware architecture.

Example 45 includes the subject matter of example 44, where the hardware architecture includes hardware architecture of a resource constrained computing device.

Example 46 is a system including means to perform the method of any one of examples 16-27.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions when executed on a machine, cause the machine to prune a neural network by:
   accessing data comprising a definition of the neural network, wherein the neural network comprises a layer having a plurality of channels;
   generating a thinned version of the layer, wherein generating the thinned version of the layer comprises:
      ranking the plurality of channels of the layer based on weight values of each of the plurality of channels,
      selecting one or more channels from the plurality of channels based on the ranking,
      pruning the layer by setting values of all weights in the selected one or more channels to zeros to form the thinned version of the layer, and
      rounding a number of unpruned channels to a multiple corresponding to a hardware architecture;
   providing input data to a thinned version of the neural network that includes the thinned version of the layer;
   determining, based on an output of the neural network, that an accuracy of the thinned version of the neural network exceeds a threshold accuracy;
   after determining that the accuracy of the thinned version of the neural network exceeds the threshold accuracy, further pruning the thinned version of the layer by modifying a weight in another channel of the layer to zero and keeping another weight in the another channel of the layer unmodified to form a further thinned version of the layer; and
   generating a pruned version of the neural network that comprises the further thinned version of the layer.

2. The storage medium of claim 1, wherein further pruning the thinned version of the layer comprises:
   determining a descriptive statistic value from weights of the thinned version of the layer;
   determining a weight threshold for the thinned version of the layer based on the descriptive statistic value; and
   selecting the weight in the another channel based on a determination that the weight in the another channel is below the weight threshold,
   wherein the another weight in the another channel is greater than or equal to the weight threshold.

3. The storage medium of claim 2, wherein the weight threshold determined for the thinned version of the layer is different from a weight threshold determined for another layer in the neural network, and the neural network is pruned further by:
   selecting a weight from weights of the another layer based on the weight threshold determined for the another layer; and
   pruning the another layer by modifying the selected weight to zero to form a thinned version of the another layer,
   wherein the pruned version of the neural network comprises the thinned version of the another layer.

4. The storage medium of claim 2, wherein the descriptive statistic value comprises a mean of absolute values of the weights of the thinned version of the layer or a standard deviation of the absolute values of the weights of the thinned version of the layer.

5. The storage medium of claim 1, wherein the neural network comprises an additional layer, and the additional layer is unpruned in the pruned version of the neural network.

6. The storage medium of claim 1, wherein the neural network is pre-trained by using a particular data set, and the input data corresponds to the particular data set.

7. The storage medium of claim 1, wherein the output of the neural network is generated through forward propagation of the input data through the thinned version of the neural network.

8. The storage medium of claim 1, wherein the thinned version of the layer comprises a first iteration of the thinned version of the layer, the thinned version of the neural network comprises a first iteration of the thinned version of the neural network, and generating the thinned version of the layer further comprises:

determining that an accuracy of the first iteration of the thinned version of the neural network exceeds the threshold accuracy;

pruning one or more additional channels in the first iteration of the thinned version of the layer to form a second iteration of the thinned version of the layer; and determining an accuracy of a second iteration of the thinned neural network, wherein the second iteration of the thinned neural network comprises the second iteration of the thinned layer.

9. The storage medium of claim 8, wherein generating the thinned version of the layer further comprises:

determining that the accuracy of the second iteration of the thinned version of the neural network falls below the threshold accuracy; and adopting the first iteration of the thinned version of the layer as the thinned version of the layer to be used to generate the pruned version of the neural network.

10. The storage medium of claim 1, wherein the neural network comprises a convolutional neural network, and the layer is a hidden layer of the convolutional neural network.

11. The storage medium of claim 1, wherein the hardware architecture comprises hardware architecture of a resource constrained computing device.

12. A system comprising:

a data processing apparatus; and a non-transitory computer-readable memory storing computer program instructions executable by the data processing apparatus to perform operations for pruning a neural network by:

accessing data comprising a definition of a neural network, wherein the neural network comprises a layer having a plurality of channels, generating a thinned version of the layer, wherein generating the thinned version of the layer comprises:

ranking the plurality of channels of the layer based on weight values of each of the plurality of channels, selecting one or more channels from the plurality of channels based on the ranking, pruning the layer by setting values of all weights in the selected one or more channels to zeros to form the thinned version of the layer, and rounding a number of unpruned channels to a multiple corresponding to a hardware architecture, providing input data to a thinned version of the neural network that includes the thinned version of the layer, determining, based on an output of the neural network, that an accuracy of the thinned version of the neural network exceeds a threshold accuracy, after determining that the accuracy of the thinned version of the neural network exceeds the threshold accuracy, further pruning the thinned version of the layer by modifying a weight in another channel of the layer to zero and keeping another weight in the another channel unmodified to form a further thinned version of the layer, and generating a pruned version of the neural network that comprises the further thinned version of the layer.

13. The system of claim 12, further comprising an interface to provide the pruned version of the neural network to a computing device.

14. The system of claim 13, wherein the computing device comprises a resource-constrained computing device.

15. A method for pruning a neural network, the method comprising:

accessing data comprising a definition of a neural network, wherein the neural network comprises a layer having a plurality of channels;

generating a thinned version of the layer by:

ranking the plurality of channels of the layer based on weight values of each of the plurality of channels, selecting one or more channels from the plurality of channels based on the ranking, pruning the layer by setting values of all weights in the selected one or more channels to zeros to form the thinned version of the layer, and rounding a number of unpruned channels to a multiple corresponding to a hardware architecture;

providing input data to a thinned version of the neural network that includes the thinned version of the layer;

determining, based on an output of the neural network, that an accuracy of the thinned version of the neural network exceeds a threshold accuracy;

after determining that the accuracy of the thinned version of the neural network exceeds the threshold accuracy, further pruning the thinned version of the layer by modifying a weight in another channel of the layer to zero and keeping another weight in the another channel unmodified to form a further thinned version of the layer; and generating a pruned version of the neural network that comprises the further thinned version of the layer.

16. The method of claim 15, wherein further pruning the thinned version of the layer comprises:

determining a weight threshold for the thinned version of the layer based on absolute values of weights in the thinned version of the layer; and selecting the one or more weights in the another channel based on a determination that the one or more weights are below the weight threshold.

17. The method of claim 16, wherein the weight threshold determined for the thinned version of the layer is different from a weight threshold determined for another layer in the neural network, and the method further comprises:

selecting a weight from a plurality of weights of the another layer based on the weight threshold determined for the another layer; and pruning the another layer by modifying the selected weight to zero to form a thinned version of the another layer, wherein the pruned version of the neural network comprises the thinned version of the another layer.

18. The method of claim 15, wherein the neural network comprises one or more other layers in addition to the layer and the one or more other layers are unpruned in the pruned version of the neural network.

* * * * *